US010363916B2

(12) United States Patent
Choi

(10) Patent No.: US 10,363,916 B2
(45) Date of Patent: Jul. 30, 2019

(54) PRESSURE CONTROL APPARATUS AND PRESSURE CONTROL METHOD THEREOF

(71) Applicant: MANDO CORPORATION, Gyeonggi-do (KR)

(72) Inventor: Kyu-Woong Choi, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/946,763

(22) Filed: Nov. 19, 2015

(65) Prior Publication Data

US 2017/0129470 A1 May 11, 2017

(30) Foreign Application Priority Data

Nov. 9, 2015 (KR) .......................... 10-2015-0156420

(51) Int. Cl.
*B60T 17/22* (2006.01)
*G01S 19/42* (2010.01)
(Continued)

(52) U.S. Cl.
CPC ............ *B60T 17/221* (2013.01); *B60T 7/042* (2013.01); *B60T 13/662* (2013.01); *B60T 17/22* (2013.01);
(Continued)

(58) Field of Classification Search
CPC ..... B60T 17/221; B60T 13/662; G01C 21/34; G01S 19/42; G07C 5/006
See application file for complete search history.

(56) References Cited

U.S. PATENT DOCUMENTS 4,917,445 A * 4/1990 Leppek ............... B60T 8/17616
303/115.2
9,073,554 B2 * 7/2015 Hyde .................. B60W 50/082
(Continued)

FOREIGN PATENT DOCUMENTS

CN 102695638 9/2012
CN 102713224 10/2012
(Continued)

OTHER PUBLICATIONS

Office Action dated Sep. 30, 2016 for Korean Patent Application No. 10-2015-0156420 and its English summary and machine translation provided by Google Translate.
(Continued)

*Primary Examiner* — Jerrah Edwards
*Assistant Examiner* — Mathew Franklin Gordon
(74) *Attorney, Agent, or Firm* — Ladas & Parry, LLP

(57) ABSTRACT

Disclosed herein are a pressure control apparatus and a pressure control method thereof. The pressure control apparatus includes an input unit configured to receive an input of a current pressure value of a brake apparatus detected by a detection apparatus when drive of the brake apparatus is prepared, a determination unit configured to determine whether the input current pressure value is a preset standard pressure value, and a control unit configured to receive the current pressure value, transfer a determination command to the determination unit, transfer a hydraulic adjustment command to the brake apparatus so that the current pressure value reaches the standard pressure value when the current pressure value is not the standard pressure value, and cause an on/off operation of the brake apparatus to be iterated a predetermined number of times for a predetermined time.

12 Claims, 26 Drawing Sheets

(51) Int. Cl.
    *G07C 5/00*    (2006.01)
    *B60T 13/66*   (2006.01)
    *G01C 21/34*   (2006.01)
    *B60T 7/04*    (2006.01)
(52) U.S. Cl.
    CPC .............. *G01C 21/34* (2013.01); *G01S 19/42* (2013.01); *G07C 5/006* (2013.01); *B60T 2210/36* (2013.01)

(56)  References Cited

U.S. PATENT DOCUMENTS

| | | | |
|---|---|---|---|
| 2011/0029170 A1 | 2/2011 | Hyde et al. | |
| 2012/0215414 A1* | 8/2012 | Watanabe | B60T 8/36 701/70 |
| 2015/0015084 A1* | 1/2015 | Ichikawa | H02J 5/005 307/104 |
| 2015/0239438 A1* | 8/2015 | Bohm | B60T 8/326 701/70 |
| 2015/0291141 A1* | 10/2015 | Miyazaki | B60T 8/4081 303/10 |

FOREIGN PATENT DOCUMENTS

| | | |
|---|---|---|
| CN | 104137385 | 11/2014 |
| CN | 104684773 | 6/2015 |
| CN | 104768817 | 7/2015 |
| JP | 2004-50905 | 2/2004 |
| JP | 4132140 | 6/2008 |
| KR | 1996-0040926 | 12/1996 |
| KR | 10-2010-0108010 | 10/2010 |
| KR | 10-2011-0138061 | 12/2011 |
| KR | 10-2013-0102064 | 9/2013 |
| WO | 2013/124977 | 8/2013 |

OTHER PUBLICATIONS

Office Action dated Sep. 27, 2016 for German Patent Application No. 10 2015 120 070.8 and its English summary and machine translation provided by Google Translate.

Breuer Bert, Bill Karlheinz H. (Hrsg.): Bremsenhandbuch. 2, Auflage, Wiesbaden: Vieweg, Jul. 2004, vol. III, IV, pp. 268-277, and its English translation by Google Translate.

Notice of Allowance dated Jan. 31, 2017 for Korean Patent Application No. 10-2015-0156420 and its English translation provided by Applicant's Foreign Council.

Office Action dated Sep. 30, 2018 for Chinese Patent Application No. 201510818568.9 and its English translation by Google Translate.

Office Action dated Mar. 11, 2019 for Chinese Patent Application No. 201510818568.9 and its English translation by Global Dossier.

* cited by examiner

1400

PRESSURE CONTROL APPARATUS AND PRESSURE CONTROL METHOD THEREOF

CROSS-REFERENCE TO RELATED APPLICATION

This application claims the benefit of Korean Patent Application No. 2015-0156420, filed on Nov. 9, 2015 in the Korean Intellectual Property Office, the disclosure of which is incorporated herein by reference.

BACKGROUND

1. Field

Embodiments of the present invention relate to a pressure control apparatus and a pressure control method thereof.

2. Description of the Related Art

In general, conventional brake apparatuses perform a braking operation by providing a pressure necessary for wheels according to a braking will of a driver who steps on a brake pedal.

However, because a normal operation is difficult during drive when there is a foreign object inside the conventional brake apparatuses, the maintenance of a current pressure is limited and the improvement of efficiency of braking is limited.

Accordingly, an improved pressure control apparatus and an improved pressure control method thereof capable of maintaining a current pressure and improving the efficiency of braking by operating a brake apparatus normally after removing a foreign object when there is a foreign object in the brake apparatus have recently been continuously studied.

Also, an improved pressure control apparatus and an improved pressure control method thereof capable of preventing a traffic accident from occurring in advance while suppressing an increase in cost of maintenance, suppressing anxiety about a current pressure state while inducing caution of driving of a driver, and reducing power waste using recovered energy when power is necessary have recently been continuously studied.

SUMMARY

Therefore, it is an aspect of the present invention to provide a pressure control apparatus and a pressure control method thereof capable of improving the efficiency of braking.

Also, it is an aspect of the present invention to provide a pressure control apparatus and a pressure control method thereof capable of suppressing an increase in cost of maintenance.

Also, it is an aspect of the present invention to provide a pressure control apparatus and a pressure control method thereof capable of suppressing anxiety about a current pressure state while inducing caution of driving of a driver.

Also, it is an aspect of the present invention to provide a pressure control apparatus and a pressure control method thereof capable of reducing power waste using recovered energy when power is necessary.

Also, it is an aspect of the present invention to provide a pressure control apparatus and a pressure control method thereof capable of efficiently using recovered energy when power is necessary.

Also, it is an aspect of the present invention to provide a pressure control apparatus and a pressure control method thereof capable of preventing a traffic accident from occurring in advance while suppressing an increase in cost of maintenance.

Additional aspects of the invention will be set forth in part in the description which follows and, in part, will be obvious from the description, or may be learned by practice of the invention.

According to an aspect of the present invention, there is a provided a pressure control apparatus including: an input unit configured to receive an input of a current pressure value of a brake apparatus detected by a detection apparatus when drive of the brake apparatus is prepared; a determination unit configured to determine whether the input current pressure value is a preset standard pressure value; and a control unit configured to receive the current pressure value, transfer a determination command to the determination unit, transfer a hydraulic adjustment command to the brake apparatus so that the current pressure value reaches the standard pressure value when the current pressure value is not the standard pressure value, and cause an on/off operation of the brake apparatus to be iterated a predetermined number of times for a predetermined time.

At this time, the brake apparatus may include a brake pedal, a motor, and a piston pump, and the input unit may receive the input of the current pressure value output from the piston pump through an operation of the motor according to a braking will of a driver who steps on the brake pedal.

Also, the brake apparatus may include a hydraulic valve, and the determination unit may determine whether the input current pressure value is the preset standard pressure value when the current pressure value is provided to the hydraulic valve.

Also, the brake apparatus may include a motor and a hydraulic valve, and the control unit may transfer a torque generation command corresponding to the hydraulic adjustment command to the motor so that the current pressure value reaches the standard pressure value when the current pressure value is not the standard pressure value, transfer a valve operation command to the hydraulic valve while causing a torque of the motor having a predetermined value to be generated for a predetermined time, and cause an on/off operation of the hydraulic valve to be iterated a predetermined number of times.

Also, the pressure control apparatus may further include: a first identification unit configured to cause a normal pressure to be identified when the current pressure value is the standard pressure value or cause an abnormal pressure to be identified when the current pressure value is not the standard pressure value.

Also, the control unit may further transfer a drive command to the brake apparatus so that the brake apparatus is driven when the current pressure value reaches the standard pressure value.

Also, the pressure control apparatus may further include: a second identification unit configured to cause the fact that the current pressure value indicates a normal pressure to be identified when the drive command is transferred to the brake apparatus.

Also, the pressure control apparatus may further include: an electric charging unit configured to charge an electric charging apparatus with a drive signal corresponding to the torque of the motor when the torque of the motor having the predetermined value is generated for the predetermined time.

Also, the pressure control apparatus may further include: a third identification unit configured to cause a current amount of electric charge to be identified when the electric charging apparatus is charged with the drive signal.

Also, the pressure control apparatus may further include: a fourth identification unit configured to cause the fact that electric charging is completed to be identified when the electric charging apparatus is completely charged with the drive signal.

Also, the brake apparatus may include a preset unique number, and the pressure control apparatus may further include: a first communication unit configured to communicate with a terminal of a vehicle maintenance service center according to control of the control unit and transfer a communication signal to the terminal of the vehicle maintenance service center for movement from the terminal of the vehicle maintenance service center to the brake apparatus having the unique number when the number of iterations of the on/off operation of the brake apparatus is out of a range of the predetermined number of times for the predetermined time.

Also, the pressure control apparatus may further include: a second communication unit configured to communicate with a global positioning system (GPS) apparatus according to control of the control unit and transfer a communication signal to the GPS apparatus so that location information of a neighboring vehicle maintenance service center is found by the GPS apparatus when the number of iterations of the on/off operation of the brake apparatus is out of a range of the predetermined number of times for the predetermined time; and a fifth identification unit configured to cause the found location information of the neighboring vehicle maintenance service center to be identified.

Also, the pressure control apparatus may further include: a first selection unit configured to select location information of a desired vehicle maintenance service center from location information of found neighboring vehicle maintenance service centers; and a drive unit configured to transfer a navigation drive signal to a navigation apparatus for an arrival at the vehicle maintenance service center in correspondence with the selected location information of the vehicle maintenance service center.

Also, the pressure control apparatus may further include: a third communication unit configured to communicate with a GPS apparatus according to control of the control unit and communicate with a terminal of a neighboring vehicle maintenance service center found by the GPS apparatus when the number of iterations of the on/off operation of the brake apparatus is out of a range of the predetermined number of times for the predetermined time; a sixth identification unit configured to cause information indicating whether to accept a movement request from the terminal of the found neighboring vehicle maintenance service center to be identified; and a second selection unit configured to accept or reject the movement request in the identified information indicating whether to accept the movement request from the terminal of the found neighboring vehicle maintenance service center.

According to another aspect of the present invention, there is provided a pressure control method including: receiving an input of a current pressure value of a brake apparatus detected by a detection apparatus when drive of the brake apparatus is prepared; determining whether the input current pressure value is a preset standard pressure value; and receiving the current pressure value, transferring a determination command to a determination unit, transferring a hydraulic adjustment command to the brake apparatus so that the current pressure value reaches the standard pressure value when the current pressure value is not the standard pressure value, and iterating an on/off operation of the brake apparatus a predetermined number of times for a predetermined time.

According to the aspect of the present invention, the pressure control apparatus and the pressure control method thereof may improve the efficiency of braking.

According to the aspect of the present invention, the pressure control apparatus and the pressure control method thereof may suppress an increase in cost of maintenance.

According to the aspect of the present invention, the pressure control apparatus and the pressure control method thereof may suppress anxiety about a current pressure state while inducing caution of driving of a driver.

According to the aspect of the present invention, the pressure control apparatus and the pressure control method thereof may reduce power waste using recovered energy when power is necessary.

According to the aspect of the present invention, the pressure control apparatus and the pressure control method thereof may efficiently use recovered energy when power is necessary.

According to the aspect of the present invention, the pressure control apparatus and the pressure control method thereof may prevent a traffic accident from occurring in advance while suppressing an increase in cost of maintenance.

Additional aspects of the invention will be set forth in part in the description which follows and, in part, will be obvious from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present invention will be described in detail with reference to the accompanying drawings. The embodiments set forth below are provided merely for illustrative purposes so as to sufficiently transfer the spirit of the present invention to those skilled in the art, and thus, may be implemented in different forms. In drawings, parts not related to the description of the present invention are omitted for clearly describing the present invention, and, for convenience of description, sizes of components may be exaggerated.

Figure 1:
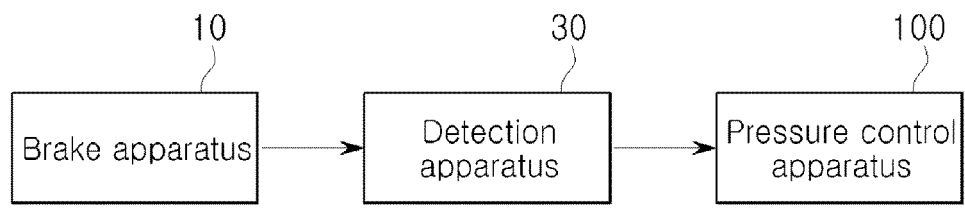
FIG. 1 is a block configuration diagram illustrating a state in which a pressure control apparatus according to a first embodiment of the present invention is connected to a brake apparatus and a detection apparatus.
Figure 2:
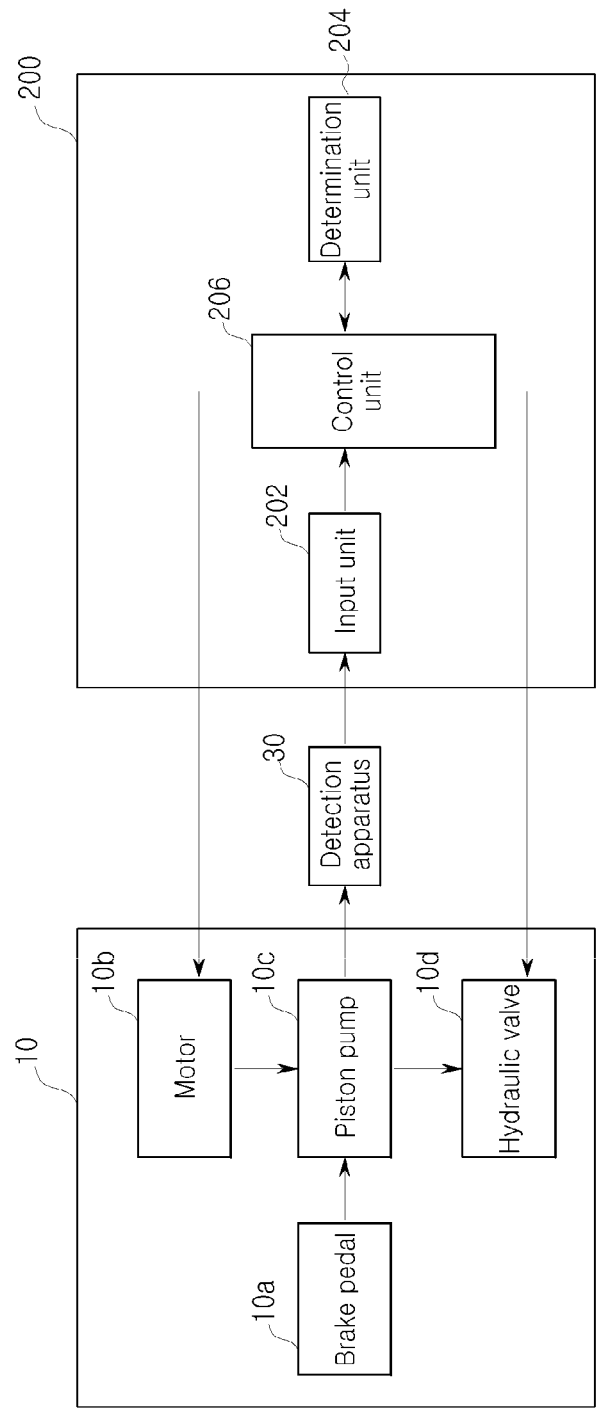
FIG. 2 is a block configuration diagram illustrating an example of the pressure control apparatus illustrated in FIG. 1.

FIG. 1 is a block configuration diagram illustrating a state in which a pressure control apparatus according to a first embodiment of the present invention is connected to a brake apparatus and a detection apparatus and FIG. 2 is a block configuration diagram illustrating an example of the pressure control apparatus illustrated in FIG. 1.

Referring to FIGS. 1 and 2, the pressure control apparatus 100 according to the first embodiment of the present invention includes an input unit 102, a determination unit 104, and a control unit 106.

When the drive of the brake apparatus 10 is prepared, the input unit 102 receives an input of a current pressure value of a brake apparatus 10 detected by a detection apparatus 30.

The determination unit 104 determines whether the current pressure value input to the input unit 102 is a preset standard pressure value according to control of the control unit 106 to be described below.

The control unit 106 receives the current pressure value output from the input unit 102, transfers a determination command to the determination unit 104, transfers a hydraulic adjustment command to the brake apparatus 10 so that the current pressure value reaches the standard pressure value when the determination unit 104 determines that the current pressure value is not the standard pressure value, and causes an on/off operation of the brake apparatus 10 to be iterated a predetermined number of times for a predetermined time.

At this time, although not illustrated, the brake apparatus 10 may be an integrated dynamic brake (IDB) apparatus (not illustrated) or an electronic stability control (ESC) integration type regenerative brake apparatus (not illustrated).

For example, the brake apparatus 10 may include a brake pedal 10*a*, a motor 10*b*, a piston pump 10*c*, and a hydraulic valve 10*d*.

Here, the input unit 102 may receive the input of the current pressure value output from the piston pump 10*c* through an operation of the motor 10*b* according to a braking will of a driver who steps on the brake pedal 10*a*.

At this time, the determination unit 104 may determine whether the current pressure value input to the input unit 102 is the preset standard pressure value according to control of the control unit 106 when the current pressure value output from the piston pump 10*c* is provided to the hydraulic valve 10*d*.

Here, the control unit 106 may transfer a torque generation command corresponding to the hydraulic adjustment command to the motor 10*b* so that the current pressure value reaches the standard pressure value when the determination unit 104 determines that the current pressure value is not the standard pressure value, transfers a valve operation command to the hydraulic valve 10*d* while causing a torque of the motor 10*b* having a predetermined value to be generated for a predetermined time, and cause an on/off operation of the hydraulic valve 10*d* to be iterated a predetermined number of times for a predetermined time.

A pressure control method for controlling a pressure using the pressure control apparatus 100 according to the first embodiment of the present invention will be described with reference to FIG. 3.

Figure 3:
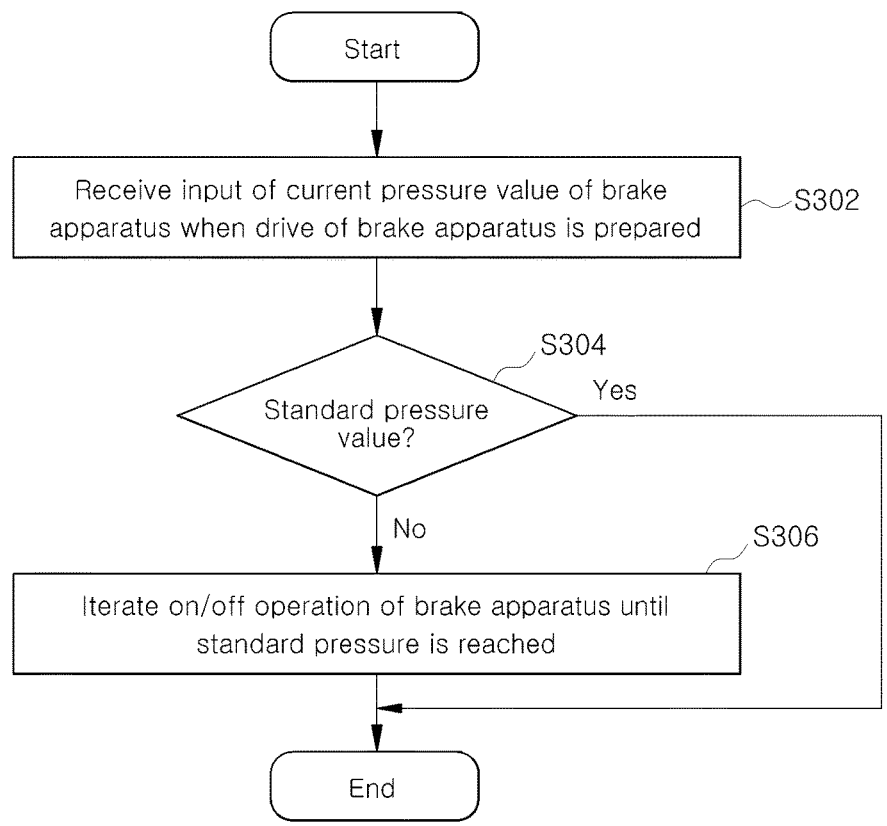
FIG. 3 is a flowchart illustrating an example of a pressure control method of the pressure control apparatus according to the first embodiment of the present invention.

FIG. 3 is a flowchart illustrating an example of the pressure control method of the pressure control apparatus according to the first embodiment of the present invention.

Referring to FIG. 3, the pressure control method 300 of the pressure control apparatus 100 (FIG. 2) according to the first embodiment of the present invention includes an input step S302, a determination step S304, and a first drive step S306.

First, in the input step S302, an input of a current pressure value of the brake apparatus 10 (FIG. 2) detected by the detection apparatus 30 (FIG. 2) is received when the drive of the brake apparatus 10 (FIG. 2) is prepared.

Thereafter, in the determination step S304, the determination unit 104 (FIG. 2) determines whether the current pressure value input to the input unit 102 (FIG. 2) is a preset standard pressure value provided in the determination unit 104 (FIG. 2) according to control of the control unit 106 (FIG. 2).

Thereafter, in the first drive step S306, the control unit 106 (FIG. 2) receives the current pressure value output from the input unit 102 (FIG. 2), transfers a determination command to the determination unit 104 (FIG. 2), transfers a hydraulic adjustment command to the brake apparatus 10 (FIG. 2) so that the current pressure value reaches the standard pressure value when the determination unit 104 (FIG. 2) determines that the current pressure value is not the standard pressure value, and causes an on/off operation of the brake apparatus 10 (FIG. 2) to be iterated a predetermined number of times for a predetermined time.

As an example, in the input step S302, the input unit 102 (FIG. 2) may receive the input of the current pressure value output from the piston pump 10c (FIG. 2) through an operation of the motor 10b (FIG. 2) according to a braking will of the driver who steps on the brake pedal 10a (FIG. 2).

Thereafter, in the determination step S304, the determination unit 104 (FIG. 2) may determine whether the current pressure value input to the input unit 102 (FIG. 2) is the preset standard pressure value according to control of the control unit 106 (FIG. 2) when the current pressure value output from the piston pump 10c (FIG. 2) is provided to the hydraulic valve 10d (FIG. 2).

Thereafter, in the first drive step S306, the control unit 106 (FIG. 2) may transfer a torque generation command corresponding to the hydraulic adjustment command to the motor 10b (FIG. 2) so that the current pressure value reaches the standard pressure value when the determination unit 104 (FIG. 2) determines that the current pressure value is not the standard pressure value, transfer a valve operation command to the hydraulic valve 10d (FIG. 2) while causing a torque of the motor 10b (FIG. 2) having a predetermined value to be generated for a predetermined time, and cause an on/off operation of the hydraulic valve 10d (FIG. 2) to be iterated a predetermined number of times for a predetermined time.

As described above, the input unit 102, the determination unit 104, and the control unit 106 included in the pressure control apparatus 100 according to the first embodiment of the present invention perform the input step S302, the determination step S304, and the first drive step S306 included in the pressure control method 300 thereof.

Accordingly, the pressure control apparatus 100 according to the first embodiment of the present invention and the pressure control method 300 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 100 according to the first embodiment of the present invention and the pressure control method 300 thereof may perform a normal operation when the brake apparatus 10 is driven by removing a foreign object located in the brake apparatus 10 through initial diagnosis, thereby maintaining the current pressure and improving the efficiency of braking.

Figure 4:
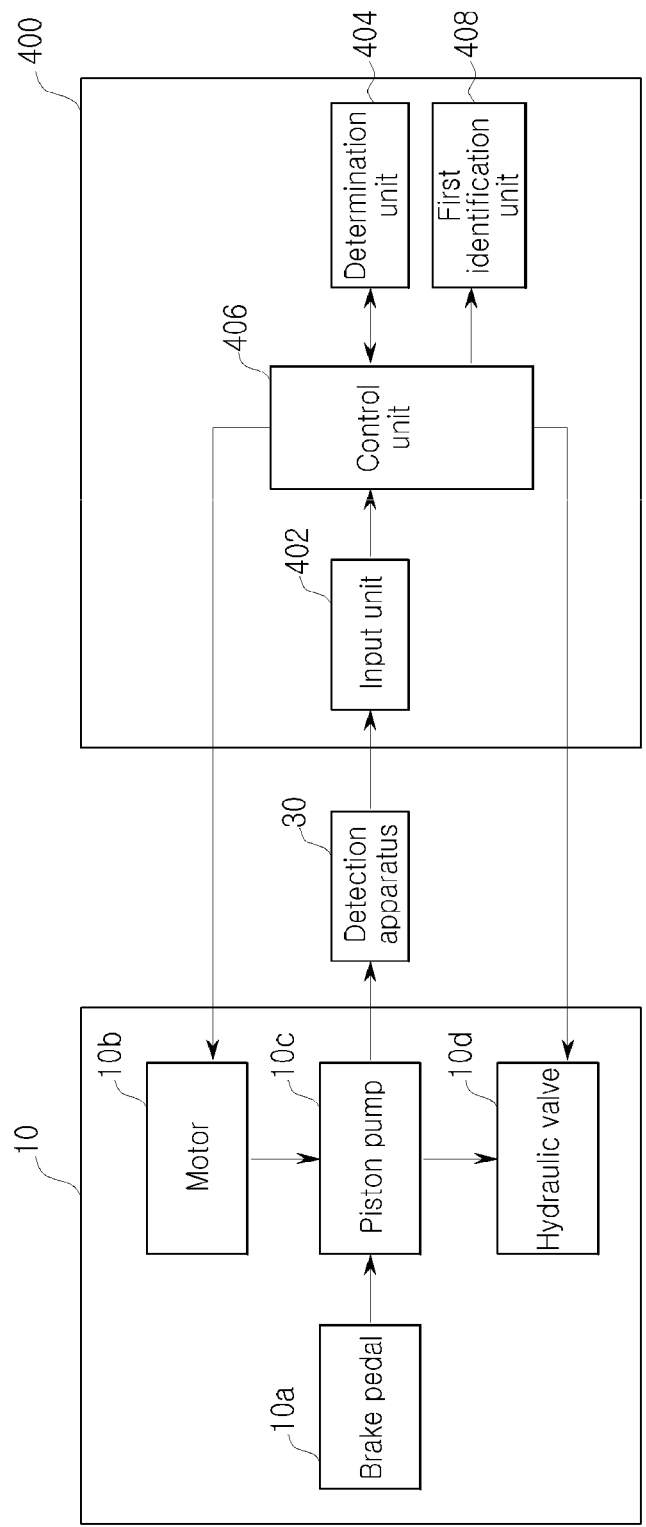
FIG. 4 is a block configuration diagram illustrating an example of a pressure control apparatus according to a second embodiment of the present invention.

FIG. 4 is a block configuration diagram illustrating an example of a pressure control apparatus according to a second embodiment of the present invention.

Referring to FIG. 4, the pressure control apparatus 400 according to the second embodiment of the present invention includes an input unit 402, a determination unit 404, and a control unit 406 as in the pressure control apparatus 100 (FIG. 2) according to the first embodiment.

Because functions of the input unit 402, the determination unit 404, and the control unit 406 of the pressure control apparatus 400 according to the second embodiment of the present invention and an organic connection relation between the units are substantially the same as functions of the input unit 102 (FIG. 2), the determination unit 104 (FIG. 2), and the control unit 106 (FIG. 2) of the pressure control apparatus 100 (FIG. 2) according to the first embodiment and an organic connection relation between the units, detailed description thereof will be omitted hereinafter.

Here, the pressure control apparatus 400 according to the second embodiment of the present invention may further include a first identification unit 408.

That is, the first identification unit 408 may cause a normal pressure to be identified according to control of the control unit 406 when the determination unit 404 determines that the current pressure value is the standard pressure value or cause an abnormal pressure to be identified according to control of the control unit 406 when the determination unit 404 determines that the current pressure value is not the standard pressure value.

At this time, although not illustrated, the first identification unit 408 may include at least one of an alarm (not illustrated), a speaker (not illustrated), and a light emitting member (not illustrated) for allowing the driver to identify the information or state of a vehicle and cause the normal or abnormal pressure to be identified through at least one operation of an alarm operation of the alarm (not illustrated), a sound generation operation of the speaker (not illustrated), and a light emitting operation of the light emitting member (not illustrated).

Also, although not illustrated, the first identification unit 408 may include at least one of a human machine interface (HMI) module (not illustrated), a head-up display (HUD) module (not illustrated) mounted to allow the driver to identify the information or state of the vehicle through an interface between a user and a machine, and cause the normal or abnormal pressure to be identified through at least one of an HMI message display operation of the HMI module (not illustrated) and an HUD message display operation of the HUD module (not illustrated).

A pressure control method for controlling a pressure using the pressure control apparatus 400 according to the second embodiment of the present invention will be described with reference to FIG. 5.

Figure 5:
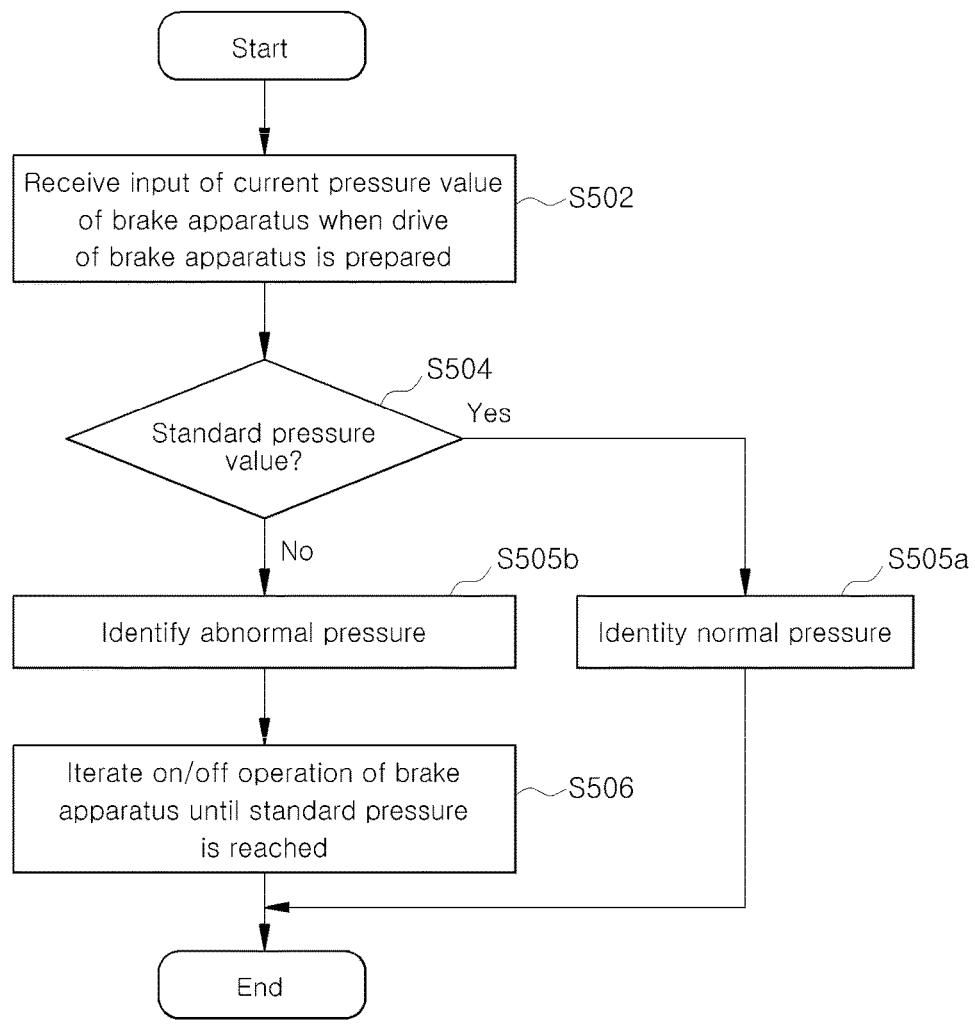
FIG. 5 is a flowchart illustrating an example of a pressure control method of the pressure control apparatus according to the second embodiment of the present invention.

FIG. 5 is a flowchart illustrating an example of the pressure control method of the pressure control apparatus according to the second embodiment of the present invention.

Referring to FIG. 5, the pressure control method 500 of the pressure control apparatus 400 (FIG. 4) according to the second embodiment of the present invention includes an input step S502, a determination step S504, and a first drive step S506 as in the pressure control method 300 (FIG. 3) of the pressure control apparatus 100 (FIG. 2) according to the first embodiment.

Because functions of the input step S502, the determination step S504, and the first drive step S506 in the pressure control method 500 of the pressure control apparatus 400 (FIG. 4) according to the second embodiment of the present invention and an organic connection relation between the steps are substantially the same as functions of the input step S302 (FIG. 3), the determination step S304 (FIG. 3), and the first drive step S306 (FIG. 3) in the pressure control method 300 (FIG. 3) of the pressure control apparatus 100 (FIG. 2) according to the first embodiment and an organic connection relation between the steps, detailed description thereof will be omitted hereinafter.

Here, the pressure control method 500 of the pressure control apparatus 400 (FIG. 4) according to the second embodiment of the present invention may further include first identification steps S505a and S505b.

As an example, the first identification steps S505a and S505b may be performed after the determination step S504 and before the drive step S506.

As another example, although not illustrated, a first identification step (not illustrated) may be performed in synchronization with the drive step S506.

At this time, in the first identification step S505a, the first identification unit 408 (FIG. 4) may cause a normal pressure to be identified according to control of the control unit 406 (FIG. 4) when the determination unit 404 (FIG. 4) determines that the current pressure value is the preset standard pressure value.

On the other hand, in the first identification step S505b, the first identification unit 408 (FIG. 4) may cause an abnormal pressure to be identified according to control of the control unit 406 (FIG. 4) when the determination unit 404 (FIG. 4) determines that the current pressure value is not the preset standard pressure value.

As described above, the input unit 402, the determination unit 404, and the control unit 406 included in the pressure control apparatus 400 according to the second embodiment of the present invention perform the input step S502, the determination step S504, the first identification steps S505a and S505b, and the first drive step S506 included in the pressure control method 500 thereof.

Accordingly, the pressure control apparatus 400 according to the second embodiment of the present invention and the pressure control method 500 thereof may transfer a hydraulic adjustment command to a brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 400 according to the second embodiment of the present invention and the pressure control method 500 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 400 according to the second embodiment of the present invention and the pressure control method 500 thereof may shorten a maintenance time for maintenance of the brake apparatus 10 because the abnormal pressure is identified when the current pressure value is not the standard pressure value, thereby suppressing an increase in maintenance cost.

Figure 6:
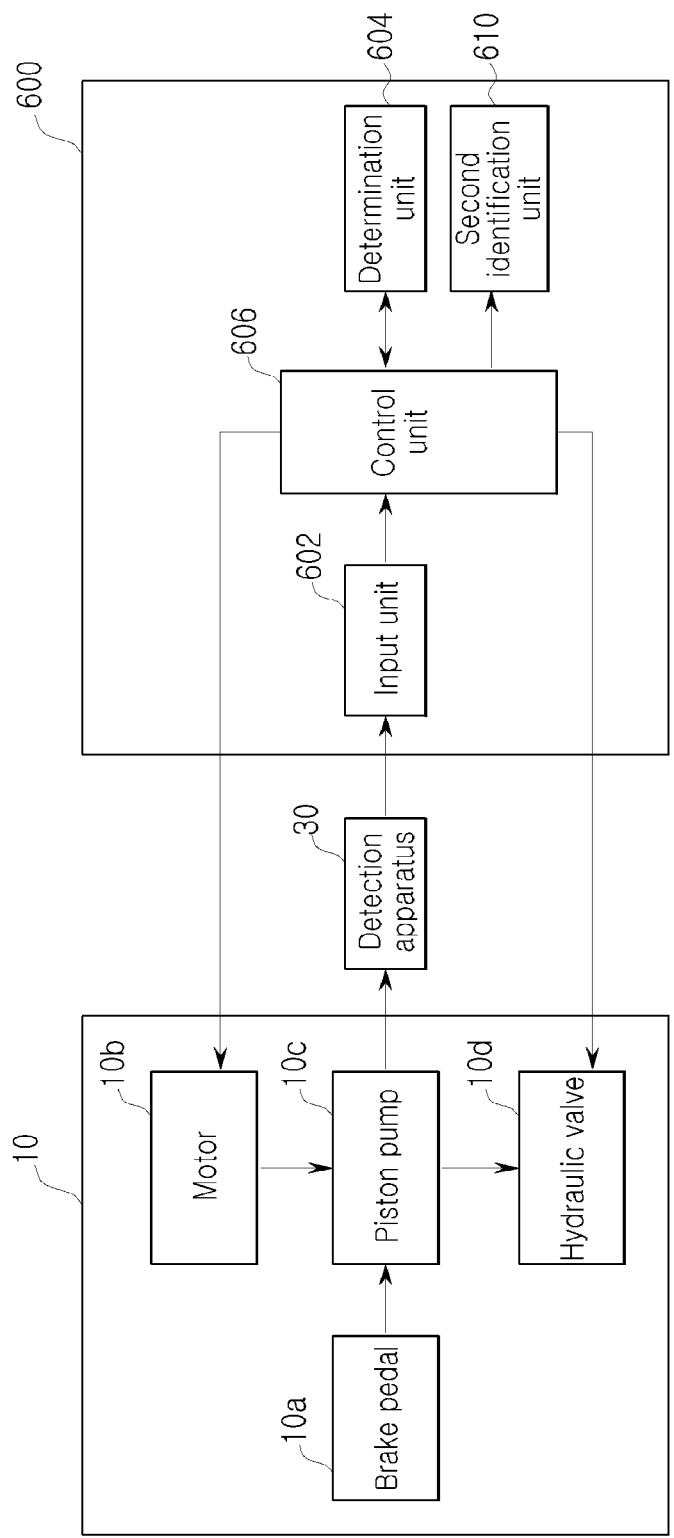
FIG. 6 is a block configuration diagram illustrating an example of a pressure control apparatus according to a third embodiment of the present invention.

FIG. 6 is a block configuration diagram illustrating an example of a pressure control apparatus according to a third embodiment of the present invention.

Referring to FIG. 6, the pressure control apparatus 600 according to the third embodiment of the present invention includes an input unit 602, a determination unit 604, and a control unit 606 as in the pressure control apparatus 100 (FIG. 2) according to the first embodiment.

Because functions of the input unit 602, the determination unit 604, and the control unit 606 of the pressure control apparatus 600 according to the third embodiment of the present invention and an organic connection relation between the units are substantially the same as functions of the input unit 102 (FIG. 2), the determination unit 104 (FIG. 2), and the control unit 106 (FIG. 2) of the pressure control apparatus 100 (FIG. 2) according to the first embodiment and an organic connection relation between the units, detailed description thereof will be omitted hereinafter.

Here, the control unit 606 of the pressure control apparatus 600 according to the third embodiment of the present invention may further transfer a drive command to the brake apparatus 10 so that the brake apparatus 10 is driven when the current pressure value reaches the standard pressure value through the on/off iteration operation of the brake apparatus 10

As an example, the control unit 606 of the pressure control apparatus 600 according to the third embodiment of the present invention may further transfer a drive command to the brake apparatus 10 so that the brake apparatus 10 is driven when the current pressure value reaches the standard pressure value through the torque generation of a motor 10b and the on/off iteration operation of a hydraulic valve 10d.

At this time, the pressure control apparatus 600 according to the third embodiment of the present invention may further include a second identification unit 610.

That is, the second identification unit 610 may cause the fact that the current pressure value indicates a normal pressure to be identified according to control of the control unit 606 when the drive command is transferred to the brake apparatus 10.

At this time, although not illustrated, the second identification unit 610 may include at least one of an alarm (not illustrated), a speaker (not illustrated), and a light emitting member (not illustrated) for allowing the driver to identify the information or state of a vehicle and cause the fact that the current pressure value indicates the normal pressure to be identified through at least one operation of an alarm operation of the alarm (not illustrated), a sound generation operation of the speaker (not illustrated), and a light emitting operation of the light emitting member (not illustrated).

Also, although not illustrated, the second identification unit 610 may include at least one of an HMI module (not illustrated) and an HUD module (not illustrated) mounted to allow the driver to identify the information or state of the vehicle through an interface between a user and a machine, and cause the fact that the current pressure value indicates the normal pressure to be identified through at least one of an HMI message display operation of the HMI module (not illustrated) and an HUD message display operation of the HUD module (not illustrated).

A pressure control method for controlling a pressure using the pressure control apparatus 600 according to the third embodiment of the present invention will be described with reference to FIG. 7.

Figure 7:
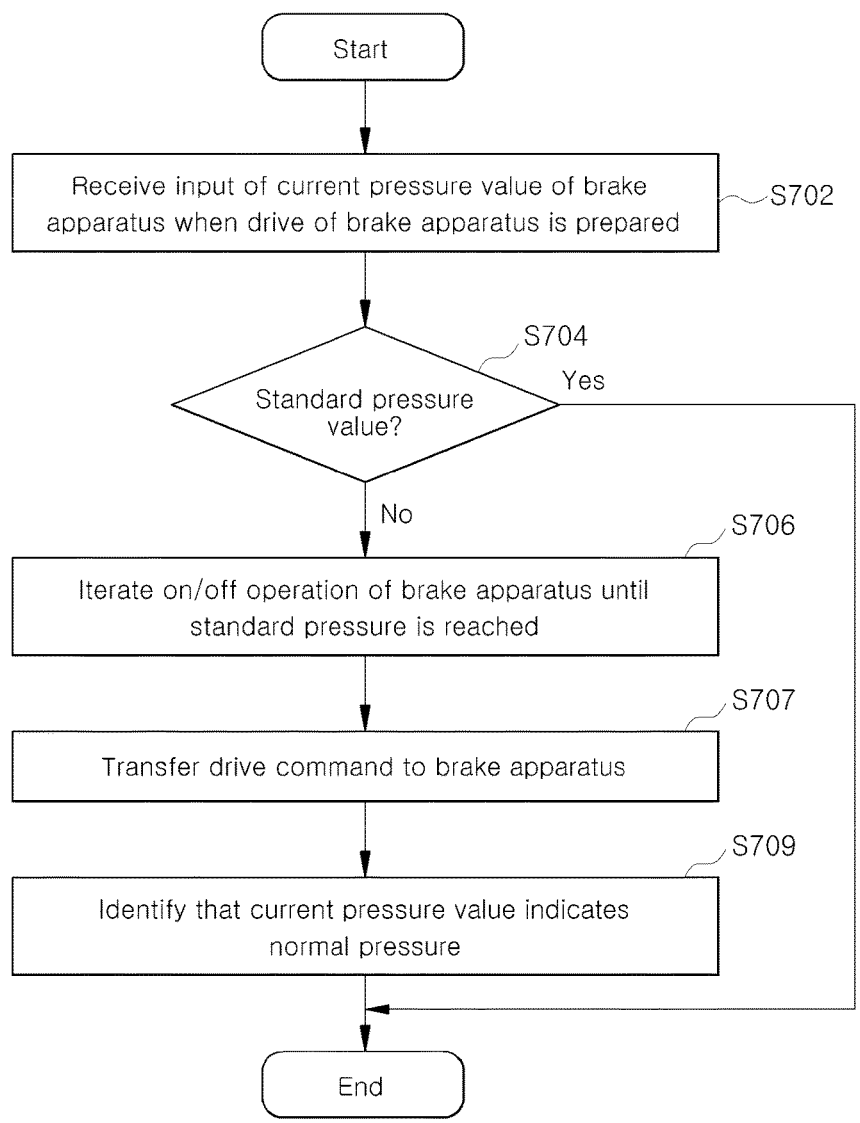
FIG. 7 is a flowchart illustrating an example of a pressure control method of the pressure control apparatus according to the third embodiment of the present invention.

FIG. 7 is a flowchart illustrating an example of the pressure control method of the pressure control apparatus according to the third embodiment of the present invention.

Referring to FIG. 7, the pressure control method 700 of the pressure control apparatus 600 (FIG. 6) according to the third embodiment of the present invention includes an input step S702, a determination step S704, and a first drive step S706 as in the pressure control method 300 (FIG. 3) of the pressure control apparatus 100 (FIG. 2) according to the first embodiment.

Because functions of the input step S702, the determination step S704, and the first drive step S706 in the pressure control method 700 of the pressure control apparatus 600 (FIG. 6) according to the third embodiment of the present invention and an organic connection relation between the steps are substantially the same as functions of the input step S302 (FIG. 3), the determination step S304 (FIG. 3), and the first drive step S306 (FIG. 3) in the pressure control method 300 (FIG. 3) of the pressure control apparatus 100 (FIG. 2) according to the first embodiment and an organic connection relation between the steps, detailed description thereof will be omitted hereinafter.

Here, the pressure control method 700 of the pressure control apparatus 600 (FIG. 6) according to the third embodiment of the present invention may further include a second drive step S707 and a second identification step S709.

First, in the second drive step S707, the control unit 606 (FIG. 6) may transfer a drive command to the brake apparatus 10 (FIG. 6) so that the brake apparatus 10 (FIG. 6) is driven when the current pressure value is the standard pressure value through an on/off iteration operation of the brake apparatus 10 (FIG. 6) according to control of the control unit 606 (FIG. 6).

As an example, in the second drive step S707, the control unit 606 (FIG. 6) may transfer a drive command to the brake apparatus 10 (FIG. 6) so that the brake apparatus 10 (FIG. 6) is driven when the current pressure value reaches the standard pressure value through the torque generation of the motor 10*b* (FIG. 6) and the on/off iteration operation of the hydraulic valve 10*d* (FIG. 6) according to control of the control unit 606 (FIG. 6).

Thereafter, in the second identification step S709, the second identification unit 610 (FIG. 6) may cause the fact that the current pressure value indicates the normal pressure to be identified according to control of the control unit 606 (FIG. 6) when the control unit 606 (FIG. 6) transfers the drive command the brake apparatus 10 (FIG. 6).

As described above, the input unit 602, the determination unit 604, and the control unit 606 included in the pressure control apparatus 600 according to the third embodiment of the present invention perform the input step S702, the determination step S704, the first drive step S706, the second drive step S707, and the second identification step S709 included in the pressure control method 700 thereof.

Accordingly, the pressure control apparatus 600 according to the third embodiment of the present invention and the pressure control method 700 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 600 according to the third embodiment of the present invention and the pressure control method 700 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 600 according to the third embodiment of the present invention and the pressure control method 700 thereof may allow the driver to recognize that the current pressure value is restored to the normal pressure value because the fact that the current pressure value is the normal pressure value is identified, thereby suppressing anxiety about a current pressure state while inducing caution of driving of the driver.

Figure 8:
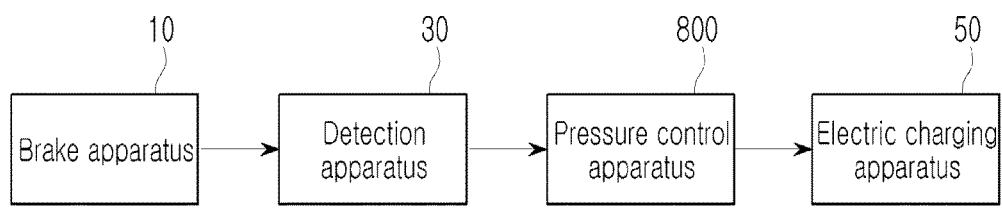
FIG. 8 is a block configuration diagram illustrating a state in which a pressure control apparatus according to a fourth embodiment of the present invention is connected to a brake apparatus, a detection apparatus, and an electric charging apparatus.
Figure 9:
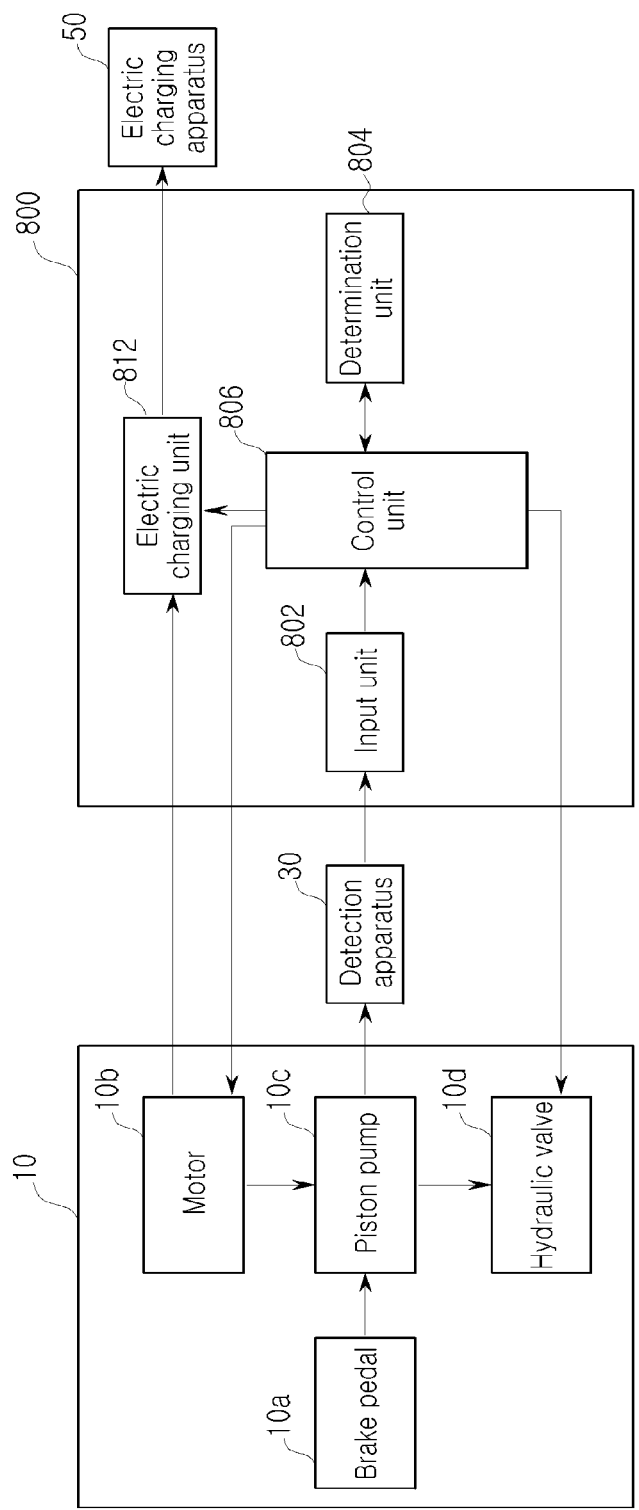
FIG. 9 is a block configuration diagram illustrating an example of the pressure control apparatus illustrated in FIG. 8.

FIG. 8 is a block configuration diagram illustrating a state in which a pressure control apparatus according to a fourth embodiment of the present invention is connected to a brake apparatus, a detection apparatus, and an electric charging apparatus, and FIG. 9 is a block configuration diagram illustrating an example of the pressure control apparatus illustrated in FIG. 8.

Referring to FIGS. 8 and 9, the pressure control apparatus 800 according to the fourth embodiment of the present invention includes an input unit 802, a determination unit 804, and a control unit 806 as in the pressure control apparatus 100 (FIG. 2) according to the first embodiment.

Because functions of the input unit 802, the determination unit 804, and the control unit 806 of the pressure control apparatus 800 according to the fourth embodiment of the present invention and an organic connection relation between the units are substantially the same as functions of the input unit 102 (FIG. 2), the determination unit 104 (FIG. 2), and the control unit 106 (FIG. 2) of the pressure control apparatus 100 (FIG. 2) according to the first embodiment and an organic connection relation between the units, detailed description thereof will be omitted hereinafter.

Here, the pressure control apparatus 800 according to the fourth embodiment of the present invention may further include an electric charging unit 812.

That is, the electric charging unit 812 may charge an electric charging apparatus 50 with a drive signal corresponding to a torque of a motor 10*b* according to control of the control unit 806 when the torque of the motor 10*b* having a predetermined value is generated for a predetermined time.

In other words, when the torque of the motor 10*b* having the predetermined value is generated for the predetermined time, the electric charging unit 812 may convert mechanical energy of the drive signal corresponding to the torque of the motor 10*b* into electric energy and charge the electric charging apparatus 50 with the electric energy according to control of the control unit 806.

Here, although not illustrated, the electric charging unit 812 may include an electric charging circuit (not illustrated) configured to convert the mechanical energy of the drive signal corresponding to the torque of the motor 10*b* into the electric energy and charge the electric charging apparatus 50 with the electric energy.

At this time, although not illustrated, the electric charging apparatus 50 may include at least one of an electronic device (not illustrated), a portable electronic device (not illustrated), and a portable mobile communication terminal (not illustrated) for electric charging.

A pressure control method for controlling a pressure using the pressure control apparatus 800 according to the fourth embodiment of the present invention will be described with reference to FIG. 10.

Figure 10:
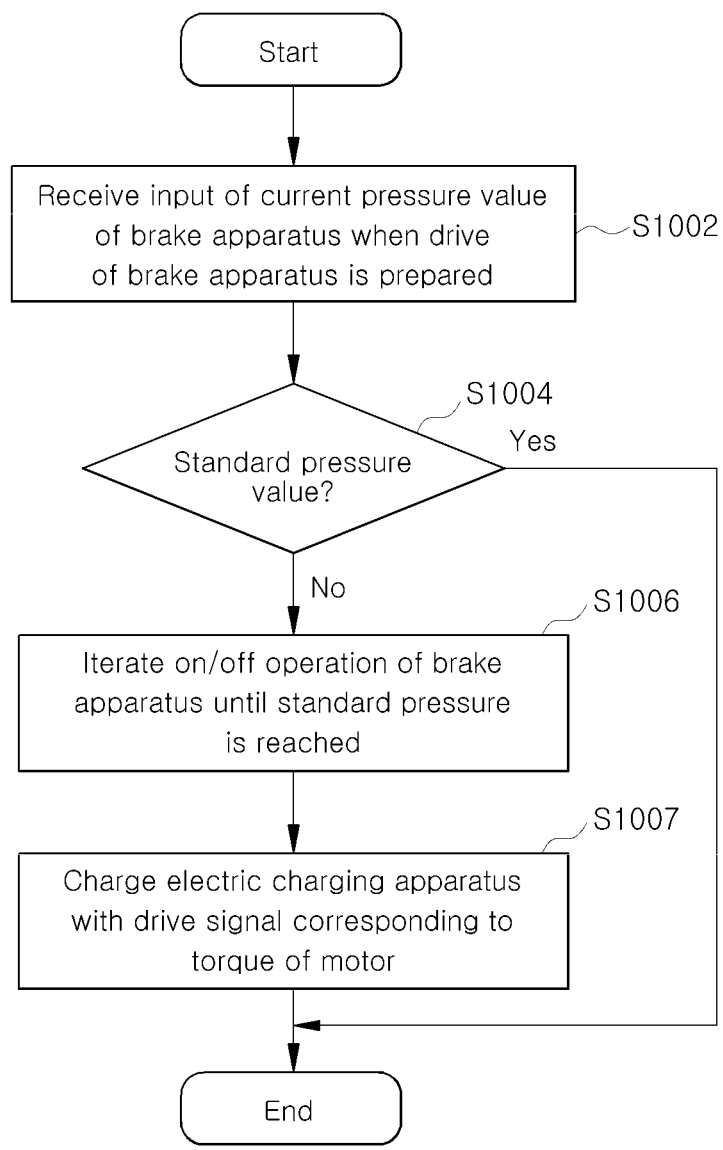
FIG. 10 is a flowchart illustrating an example of a pressure control method of the pressure control apparatus according to the fourth embodiment of the present invention.

FIG. 10 is a flowchart illustrating an example of the pressure control method of the pressure control apparatus according to the fourth embodiment of the present invention.

Referring to FIG. 10, the pressure control method 1000 of the pressure control apparatus 800 (FIG. 9) according to the fourth embodiment of the present invention includes an input step S1002, a determination step S1004, and a first drive step S1006 as in the pressure control method 300 (FIG. 3) of the pressure control apparatus 100 (FIG. 2) according to the first embodiment.

Because functions of the input step S1002, the determination step S1004, and the first drive step S1006 in the pressure control method 1000 of the pressure control apparatus 800 (FIG. 9) according to the fourth embodiment of the present invention and an organic connection relation between the steps are substantially the same as functions of the input step S302 (FIG. 3), the determination step S304 (FIG. 3), and the first drive step S306 (FIG. 3) in the pressure control method 300 (FIG. 3) of the pressure control apparatus 100 (FIG. 2) according to the first embodiment and an organic connection relation between the steps, detailed description thereof will be omitted hereinafter.

Here, the pressure control method 1000 of the pressure control apparatus 800 (FIG. 9) according to the fourth embodiment of the present invention may further include an electric charging step S1007.

As an example, the electric charging step S1007 may be performed after the first drive step S1006.

As another example, although not illustrated, the electric charging step S1007 may be performed in synchronization with a first drive step (not illustrated).

In the electric charging step S1007, the electric charging unit 812 (FIG. 9) charges the electric charging apparatus 50 (FIG. 9) with a drive signal corresponding to a torque of the motor 10b (FIG. 9) according to control of the control unit 806 (FIG. 9) when the torque of the motor 10b (FIG. 9) having a predetermined value is generated for a predetermined time.

As described above, the input unit 802, the determination unit 804, the control unit 806, and the electric charging unit 812 included in the pressure control apparatus 800 according to the fourth embodiment of the present invention perform the input step S1002, the determination step S1004, the first drive step S1006, and the electric charging step S1007 included in the pressure control method 1000 thereof.

Accordingly, the pressure control apparatus 800 according to the fourth embodiment of the present invention and the pressure control method 1000 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 800 according to the fourth embodiment of the present invention and the pressure control method 1000 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 800 according to the fourth embodiment of the present invention and the pressure control method 1000 thereof may reduce power waste because the electric charging apparatus 50 may be charged with the drive signal corresponding to the torque of the motor 10b when the torque of the motor 10b having the predetermined value is generated for the predetermined time and recovered energy is available when power is necessary.

Figure 11:
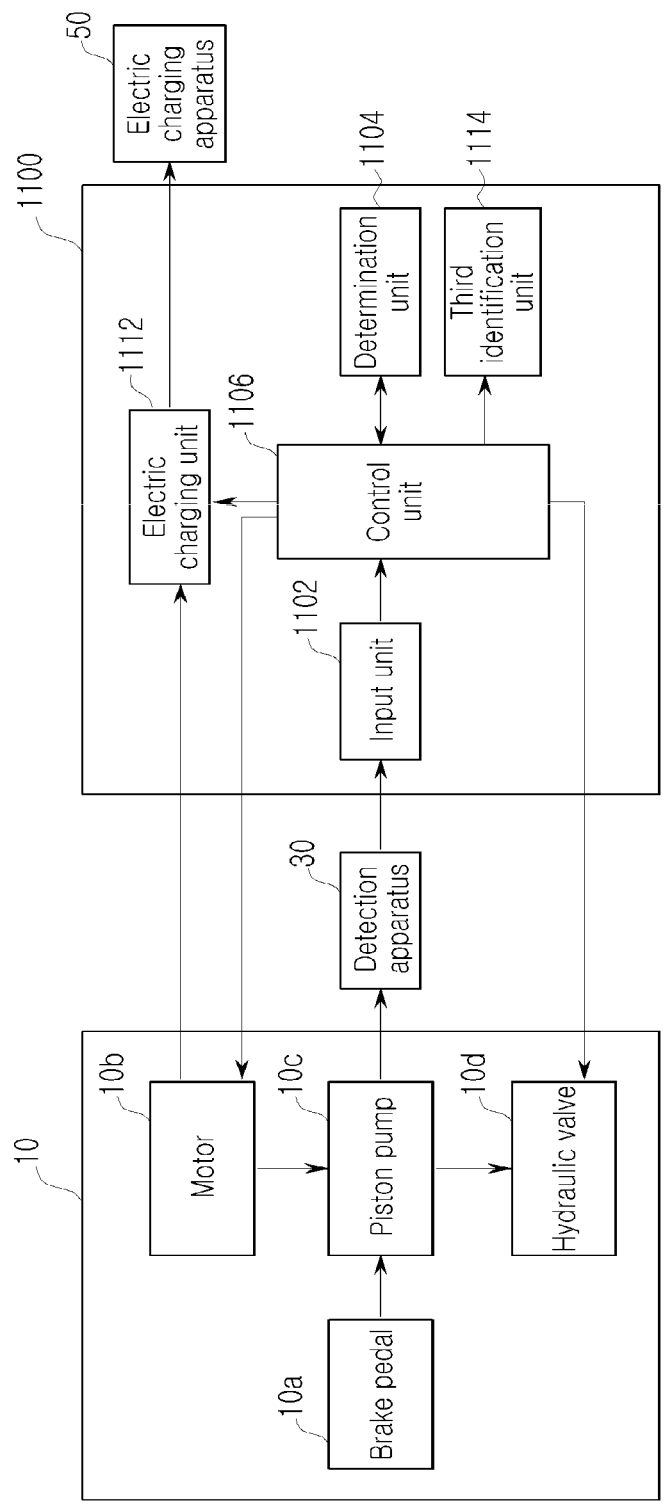
FIG. 11 is a block configuration diagram illustrating an example of a pressure control apparatus according to a fifth embodiment of the present invention.

FIG. 11 is a block configuration diagram illustrating an example of a pressure control apparatus according to a fifth embodiment of the present invention.

Referring to FIG. 11, the pressure control apparatus 1100 according to the fifth embodiment of the present invention includes an input unit 1102, a determination unit 1104, a control unit 1106, and an electric charging unit 1112 as in the pressure control apparatus 800 (FIG. 9) according to the fourth embodiment.

Because functions of the input unit 1102, the determination unit 1104, the control unit 1106, and the electric charging unit 1112 of the pressure control apparatus 1100 according to the fifth embodiment of the present invention and an organic connection relation between the units are substantially the same as functions of the input unit 802 (FIG. 9), the determination unit 804 (FIG. 9), the control unit 806 (FIG. 9), and the electric charging unit 812 (FIG. 9) of the pressure control apparatus 800 (FIG. 9) according to the fourth embodiment and an organic connection relation between the units, detailed description thereof will be omitted hereinafter.

Here, the pressure control apparatus 1100 according to the fifth embodiment of the present invention may further include a third identification unit 1114.

That is, the third identification unit 1114 may cause a current amount of electric charge to be identified according to control of the control unit 1106 when an electric charging apparatus 50 is charged with a drive signal corresponding to a torque of a motor 10b.

At this time, although not illustrated, the third identification unit 1114 may include at least one of an alarm (not illustrated), a speaker (not illustrated), and a light emitting member (not illustrated) for allowing the driver to identify the information or state of a vehicle, include at least one of an HMI module (not illustrated), an HUD module (not illustrated) mounted to allow the driver to identify the information or state of the vehicle through an interface between a user and a machine, and cause the current amount of electric charge to be identified through at least one operation of an alarm operation of the alarm (not illustrated), a sound generation operation of the speaker (not illustrated), a light emitting operation of the light emitting member (not illustrated), an HMI message display operation of the HMI module (not illustrated), and an HUD message display operation of the HUD module (not illustrated).

A pressure control method for controlling a pressure using the pressure control apparatus 1100 according to the fifth embodiment of the present invention will be described with reference to FIG. 12.

Figure 12:
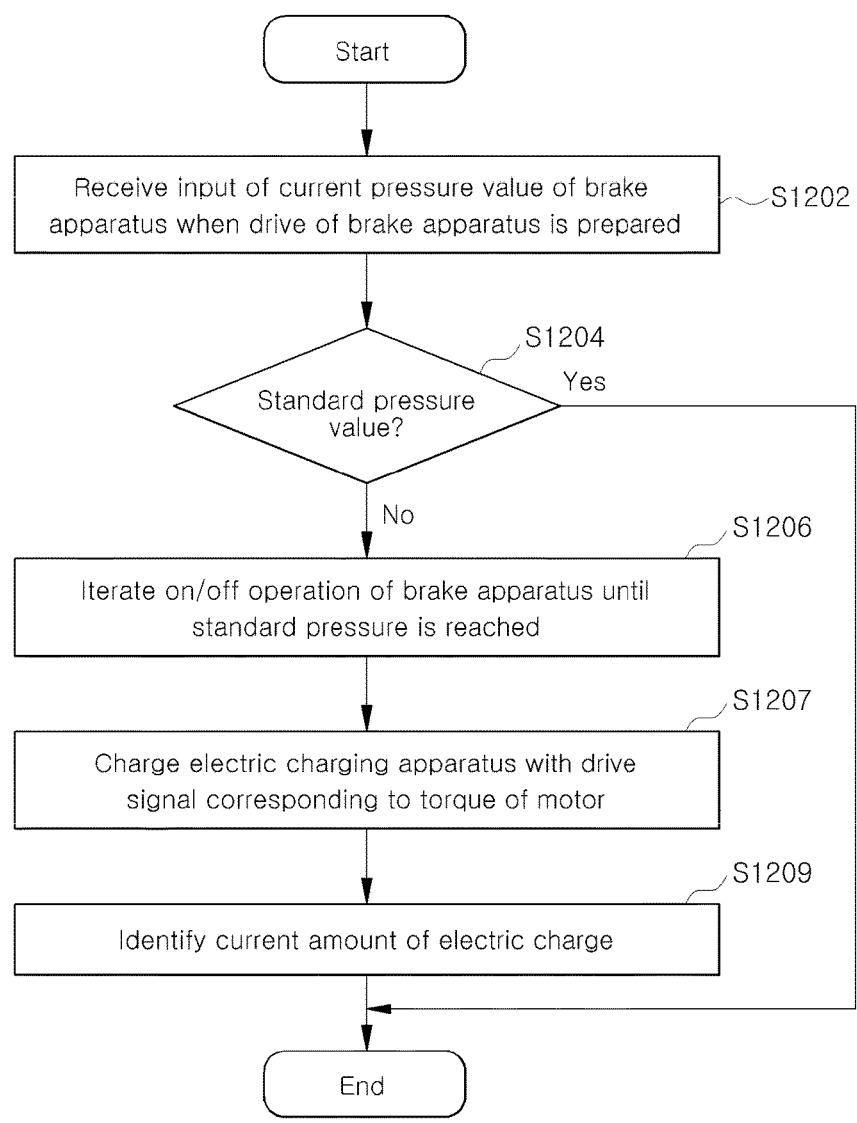
FIG. 12 is a flowchart illustrating an example of a pressure control method of the pressure control apparatus according to the fifth embodiment of the present invention.

FIG. 12 is a flowchart illustrating an example of the pressure control method of the pressure control apparatus according to the fifth embodiment of the present invention.

Referring to FIG. 12, the pressure control method 1200 of the pressure control apparatus 1100 (FIG. 11) according to the fifth embodiment of the present invention includes an input step S1202, a determination step S1204, a first drive step S1206, and an electric charging step S1207 as in the pressure control method 1000 (FIG. 10) of the pressure control apparatus 800 (FIG. 9) according to the fourth embodiment.

Because functions of the input step S1202, the determination step S1204, the first drive step S1206, and the electric charging step S1207 in the pressure control method 1200 of the pressure control apparatus 1100 (FIG. 11) according to the fifth embodiment of the present invention and an organic connection relation between the steps are substantially the same as functions of the input step S1002 (FIG. 10), the determination step S1004 (FIG. 10), the first drive step S1006 (FIG. 10) and the electric charging step S1007 (FIG. 10) in the pressure control method 1000 (FIG. 10) of the pressure control apparatus 800 (FIG. 9) according to the fourth embodiment and an organic connection relation between the steps, detailed description thereof will be omitted hereinafter.

Here, the pressure control method 1200 of the pressure control apparatus 1100 (FIG. 11) according to the fifth embodiment of the present invention may further include a third identification step S1209.

As an example, the third identification step S1209 may be performed after the electric charging step S1207.

As another example, although not illustrated, the third identification step S1209 may be performed in synchronization with an electric charging step (not illustrated).

In this third identification step S1209, the third identification unit 1114 (FIG. 11) may cause a current amount of electric charge to be identified according to control of the control unit 1106 (FIG. 11) when the electric charging unit 1112 (FIG. 11) receives a drive signal corresponding to a torque of the motor 10*b* (FIG. 11) and charges the electric charging apparatus 50 (FIG. 11) with the drive signal.

As described above, the input unit 1102, the determination unit 1104, the control unit 1106, the electric charging unit 1112, and the third identification unit 1114 included in the pressure control apparatus 1100 according to the fifth embodiment of the present invention perform the input step S1202, the determination step S1204, the first drive step S1206, the electric charging step S1207, and the third identification step S1209 included in the pressure control method 1200 thereof.

Accordingly, the pressure control apparatus 1100 according to the fifth embodiment of the present invention and the pressure control method 1200 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 1100 according to the fifth embodiment of the present invention and the pressure control method 1200 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 1100 according to the fifth embodiment of the present invention and the pressure control method 1200 thereof may reduce power waste because the electric charging apparatus 50 may be charged with the drive signal corresponding to the torque of the motor 10*b* when the torque of the motor 10*b* having the predetermined value is generated for the predetermined time and recovered energy is available when power is necessary.

Further, the pressure control apparatus 1100 according to the fifth embodiment of the present invention and the pressure control method 1200 thereof may efficiently use recovered energy when power is necessary because a current amount of electric charge is identified or recognized when the electric charging apparatus 50 is charged with the drive signal corresponding to the torque of the motor 10*b* having the predetermined value is generated for the predetermined time.

Figure 13:
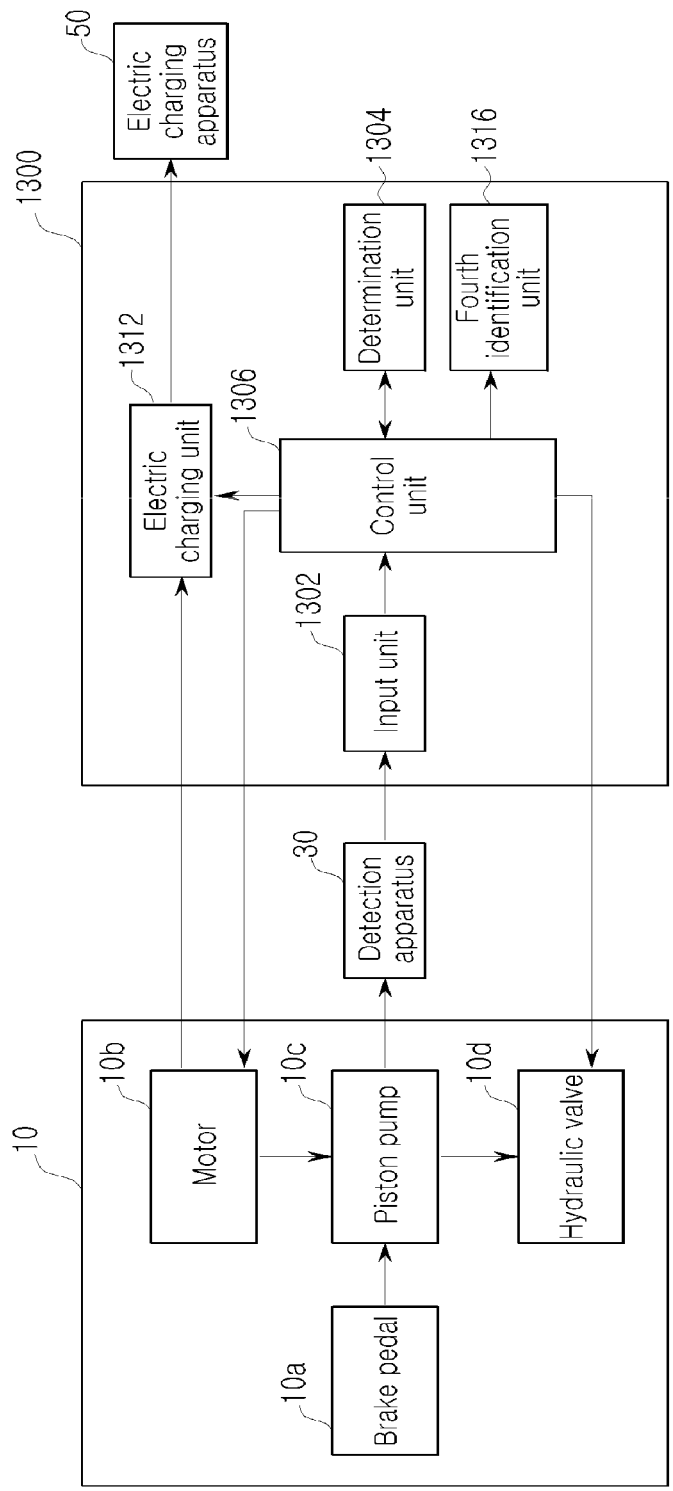
FIG. 13 is a block configuration diagram illustrating an example of a pressure control apparatus according to a sixth embodiment of the present invention.

FIG. 13 is a block configuration diagram illustrating an example of a pressure control apparatus according to a sixth embodiment of the present invention.

Referring to FIG. 13, the pressure control apparatus 1300 according to the sixth embodiment of the present invention includes an input unit 1302, a determination unit 1304, a control unit 1306, and an electric charging unit 1312 as in the pressure control apparatus 800 (FIG. 9) according to the fourth embodiment.

Because functions of the input unit 1302, the determination unit 1304, the control unit 1306, and the electric charging unit 1312 of the pressure control apparatus 1300 according to the sixth embodiment of the present invention and an organic connection relation between the units are substantially the same as functions of the input unit 802 (FIG. 9), the determination unit 804 (FIG. 9), the control unit 806 (FIG. 9), and the electric charging unit 812 (FIG. 9) of the pressure control apparatus 800 (FIG. 9) according to the fourth embodiment and an organic connection relation between the units, detailed description thereof will be omitted hereinafter.

Here, the pressure control apparatus 1300 according to the sixth embodiment of the present invention may further include a fourth identification unit 1316.

That is, the fourth identification unit 1316 may cause the completion of electric charging to be identified according to control of the control unit 1306 when an electric charging apparatus 50 is completely charged with a drive signal corresponding to the torque of a motor 10*b*.

At this time, although not illustrated, the fourth identification unit 1316 may include at least one of an alarm (not illustrated), a speaker (not illustrated), and a light emitting member (not illustrated) for allowing the driver to identify the information or state of a vehicle, include at least one of an HMI module (not illustrated), an HUD module (not illustrated) mounted to allow the driver to identify the information or state of the vehicle through an interface between a user and a machine, and cause the completion of electric charging to be identified through at least one operation of an alarm operation of the alarm (not illustrated), a sound generation operation of the speaker (not illustrated), a light emitting operation of the light emitting member (not illustrated), an HMI message display operation of the HMI module (not illustrated) and an HUD message display operation of the HUD module (not illustrated).

A pressure control method for controlling a pressure using the pressure control apparatus 1300 according to the sixth embodiment of the present invention will be described with reference to FIG. 14.

Figure 14:
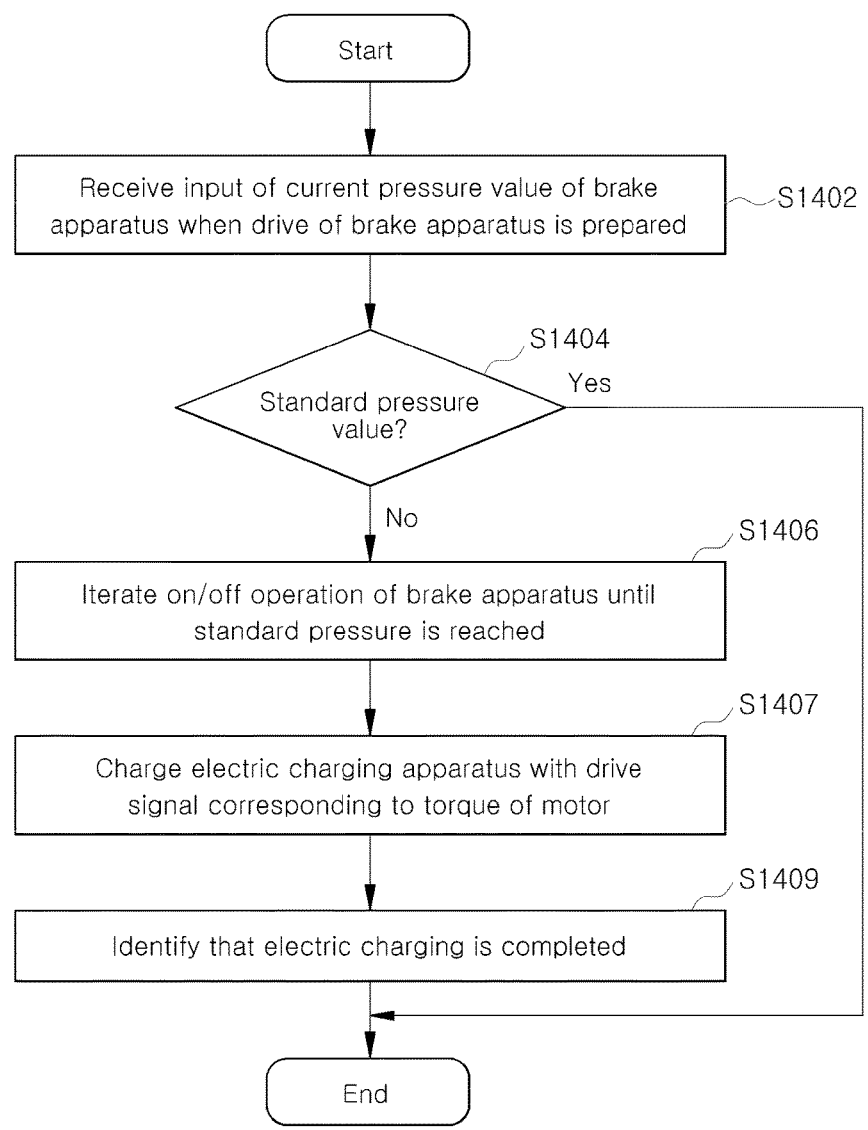
FIG. 14 is a flowchart illustrating an example of a pressure control method of the pressure control apparatus according to the sixth embodiment of the present invention.

FIG. 14 is a flowchart illustrating an example of the pressure control method of the pressure control apparatus according to the sixth embodiment of the present invention.

Referring to FIG. 14, the pressure control method 1400 of the pressure control apparatus 1300 (FIG. 13) according to the sixth embodiment of the present invention includes an input step S1402, a determination step S1404, a first drive step S1406, and an electric charging step S1407 as in the pressure control method 1000 (FIG. 10) of the pressure control apparatus 800 (FIG. 9) according to the fourth embodiment.

Because functions of the input step S1402, the determination step S1404, the first drive step S1406, and the electric charging step S1407 in the pressure control method 1400 of the pressure control apparatus 1300 (FIG. 13) according to the sixth embodiment of the present invention and an organic connection relation between the steps are substantially the same as functions of the input step S1002 (FIG. 10), the determination step S1004 (FIG. 10), the first drive step S1006 (FIG. 10) and the electric charging step S1007 (FIG. 10) in the pressure control method 1000 (FIG. 10) of the pressure control apparatus 800 (FIG. 9) according to the fourth embodiment and an organic connection relation between the steps, detailed description thereof will be omitted hereinafter.

Here, the pressure control method 1400 of the pressure control apparatus 1300 (FIG. 13) according to the sixth embodiment of the present invention may further include a fourth identification step S1409.

As an example, the fourth identification step S1409 may be performed after the electric charging step S1407.

In this fourth identification step S1409, the fourth identification unit 1316 (FIG. 13) may cause the completion of electric charging to be identified according to control of the control unit 1306 (FIG. 13) when the electric charging unit 1312 (FIG. 13) receives a drive signal corresponding to a torque of the motor 10b (FIG. 13) and completely charges the electric charging apparatus 50 (FIG. 13) with the drive signal (FIG. 13).

As described above, the input unit 1302, the determination unit 1304, the control unit 1306, the electric charging unit 1312, and the fourth identification unit 1316 included in the pressure control apparatus 1300 according to the sixth embodiment of the present invention perform the input step S1402, the determination step S1404, the first drive step S1406, the electric charging step S1407, and the fourth identification step S1409 included in the pressure control method 1400 thereof.

Accordingly, the pressure control apparatus 1300 according to the sixth embodiment of the present invention and the pressure control method 1400 thereof may transfer a hydraulic adjustment command to a brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 1300 according to the sixth embodiment of the present invention and the pressure control method 1400 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 1300 according to the sixth embodiment of the present invention and the pressure control method 1400 thereof may reduce power waste because the electric charging apparatus 50 may be charged with the drive signal corresponding to the torque of the motor 10b when the torque of the motor 10b having the predetermined value is generated for the predetermined time and recovered energy is available when power is necessary.

Further, the pressure control apparatus 1300 according to the sixth embodiment of the present invention and the pressure control method 1400 thereof may efficiently use recovered energy when power is necessary because a current amount of electric charge is identified or recognized when the electric charging apparatus 50 is charged with the drive signal corresponding to the torque of the motor 10b.

Figure 15:
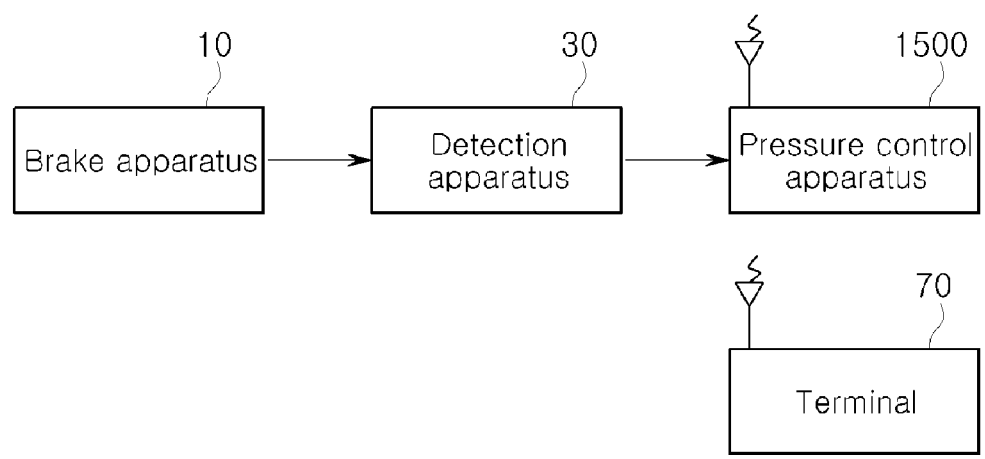
FIG. 15 is a block configuration diagram illustrating a state in which a pressure control apparatus according to a seventh embodiment of the present invention is connected to a brake apparatus and a detection apparatus and communicates with a terminal.
Figure 16:
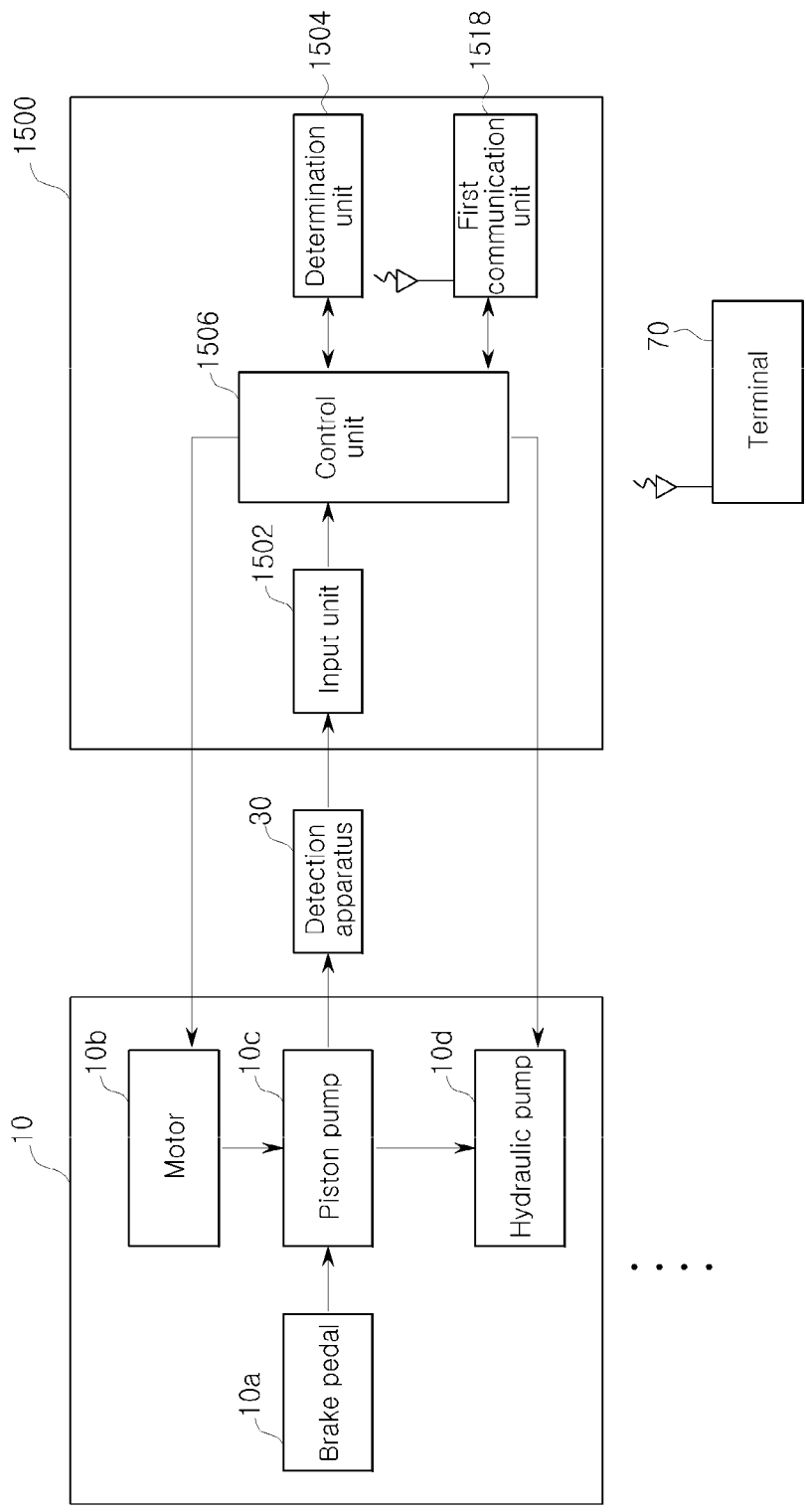
FIG. 16 is a block configuration diagram illustrating an example of the pressure control apparatus illustrated in FIG. 15.

FIG. 15 is a block configuration diagram illustrating a state in which a pressure control apparatus according to a seventh embodiment of the present invention is connected to a brake apparatus and a detection apparatus and communicates with a terminal, and FIG. 16 is a block configuration diagram illustrating an example of the pressure control apparatus illustrated in FIG. 15.

Referring to FIGS. 15 and 16, the pressure control apparatus 1500 according to the seventh embodiment of the present invention includes an input unit 1502, a determination unit 1504, and a control unit 1506 as in the pressure control apparatus 100 (FIG. 2) according to the first embodiment.

Because functions of the input unit 1502, the determination unit 1504, and the control unit 1506 of the pressure control apparatus 1500 according to the seventh embodiment of the present invention and an organic connection relation between the units are substantially the same as functions of the input unit 102 (FIG. 2), the determination unit 104 (FIG. 2), and the control unit 106 (FIG. 2) of the pressure control apparatus 100 (FIG. 2) according to the first embodiment and an organic connection relation between the units, detailed description thereof will be omitted hereinafter.

Here, the brake apparatus 10 of the pressure control apparatus 1500 according to the seventh embodiment of the present invention may further include a preset unique number.

At this time, a first communication unit 1518 may communicate with the terminal 70 of a vehicle maintenance service center according to control of the control unit 1506 and transfer a communication signal to the terminal 70 of the vehicle maintenance service center for movement to the brake apparatus 10 having the unique number when the determination unit 1504 determines that the number of iterations of the on/off operation of the brake apparatus 10 is out of a range of the predetermined number of times for the predetermined time.

At this time, although not illustrated, the first communication unit 1518 may include at least one of a Bluetooth module (not illustrated), a Wi-Fi module (not illustrated), a Zigbee module (not illustrated), a Wibro module (not illustrated), a Wi-Max module (not illustrated), an LTE module (not illustrated), an LTE Advanced module (not illustrated), an Li-Fi module (not illustrated), and a Beacon module (not illustrated), thereby communicating with the terminal 70 of the vehicle maintenance service center.

A pressure control method for controlling a pressure using the pressure control apparatus 1500 according to the seventh embodiment of the present invention will be described with reference to FIG. 17.

Figure 17:
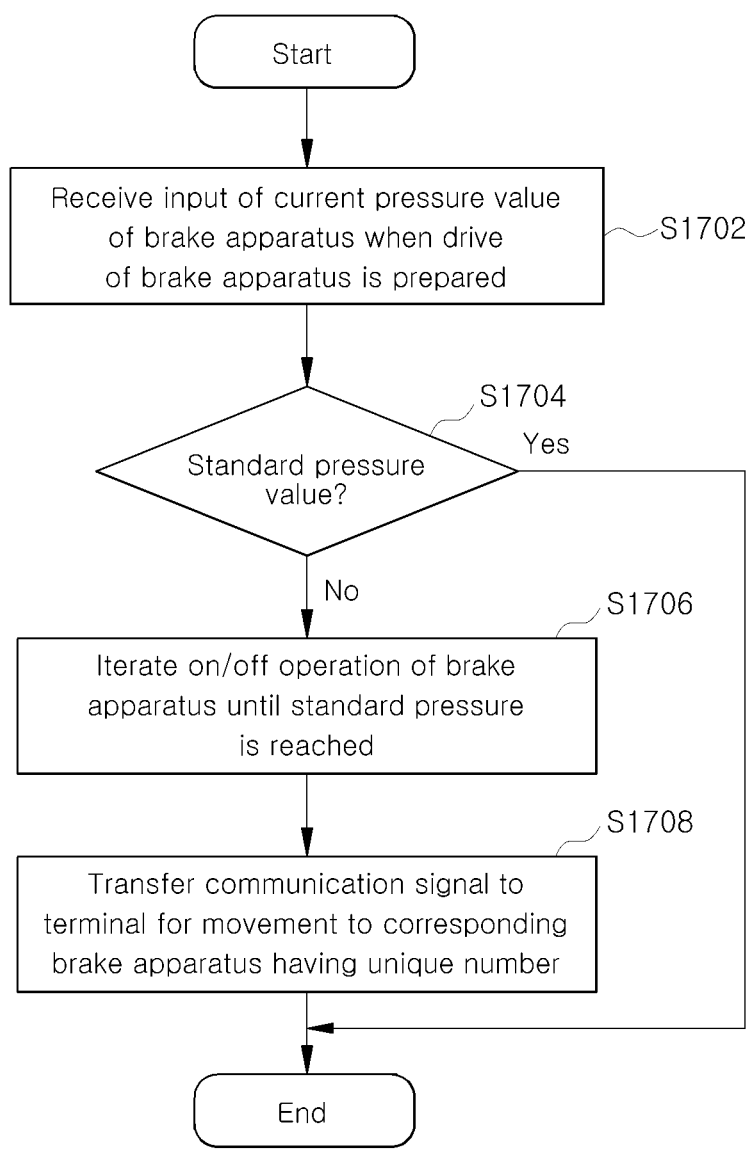
FIG. 17 is a flowchart illustrating an example of a pressure control method of the pressure control apparatus according to the seventh embodiment of the present invention.

FIG. 17 is a flowchart illustrating an example of the pressure control method of the pressure control apparatus according to the seventh embodiment of the present invention.

Referring to FIG. 17, the pressure control method 1700 of the pressure control apparatus 1500 (FIG. 16) according to the seventh embodiment of the present invention includes an input step S1702, a determination step S1704, and a first drive step S1706 as in the pressure control method 300 (FIG. 3) of the pressure control apparatus 100 (FIG. 2) according to the first embodiment.

Because functions of the input step S1702, the determination step S1704, and the first drive step S1706 in the pressure control method 1700 of the pressure control apparatus 1500 (FIG. 16) according to the seventh embodiment of the present invention and an organic connection relation between the steps are substantially the same as functions of the input step S302 (FIG. 3), the determination step S304 (FIG. 3), and the first drive step S306 (FIG. 3) in the pressure control method 300 (FIG. 3) of the pressure control apparatus 100 (FIG. 2) according to the first embodiment and an organic connection relation between the steps, detailed description thereof will be omitted hereinafter.

Here, the pressure control method 1700 of the pressure control apparatus 1500 (FIG. 16) according to the seventh embodiment of the present invention may further include a first communication step S1708.

As an example, the first communication step S1708 may be performed after the first drive step S1706.

That is, in the first communication step S1708, the first communication unit 1518 (FIG. 16) may communicate with the terminal 70 (FIG. 16) of a vehicle maintenance service center according to control of the control unit 1506 (FIG. 16) and transfer a communication signal to the terminal 70 (FIG. 16) of the vehicle maintenance service center according to control of the control unit 1506 (FIG. 16) so that a manager having the terminal 70 (FIG. 16) of the vehicle maintenance service center moves to the brake apparatus 10 (FIG. 16) having the unique number when the determination unit 1504 (FIG. 16) determines that the number of iterations of the on/off operation of the brake apparatus 10 (FIG. 16) is out of a range of the predetermined number of times for the predetermined time.

As described above, the input unit 1502, the determination unit 1504, the control unit 1506, and the first communication unit 1518 included in the pressure control apparatus 1500 according to the seventh embodiment of the present invention perform the input step S1702, the determination step S1704, the first drive step S1706, and the first communication step S1708 included in the pressure control method 1700 thereof.

Accordingly, the pressure control apparatus 1500 according to the seventh embodiment of the present invention and the pressure control method 1700 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 1500 according to the seventh embodiment of the present invention and the pressure control method 1700 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 1500 according to the seventh embodiment of the present invention and the pressure control method 1700 thereof may enable the manager having the terminal 70 of the vehicle maintenance service center to move to the brake apparatus 10 having the unique number when the number of iterations of the on/off operation of the brake apparatus 10 is out of a range of the predetermined number of times for the predetermined time.

Accordingly, the pressure control apparatus 1500 according to the seventh embodiment of the present invention and the pressure control method 1700 thereof may further suppress an increase in maintenance cost because a maintenance time for maintenance of the brake apparatus 10 may be shortened.

Figure 18:
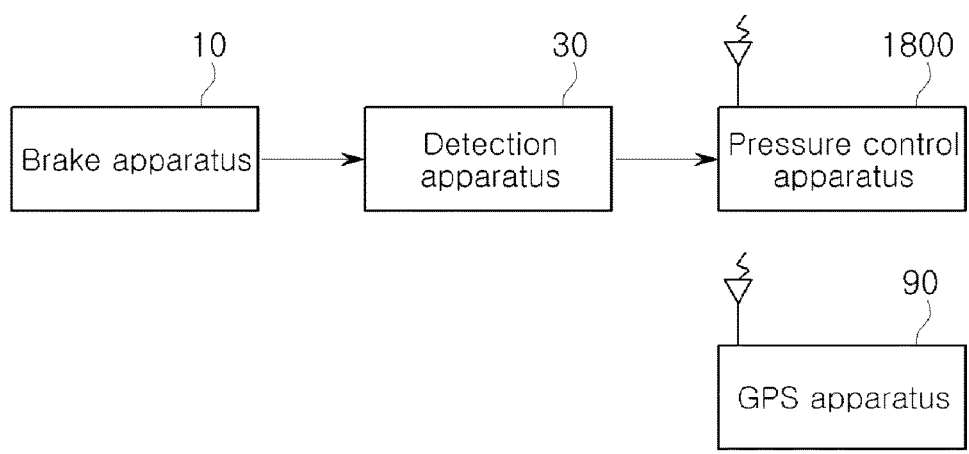
FIG. 18 is a block configuration diagram illustrating a state in which a pressure control apparatus according to an eighth embodiment of the present invention is connected to a brake apparatus and a detection apparatus and communicates with a GPS apparatus.
Figure 19:
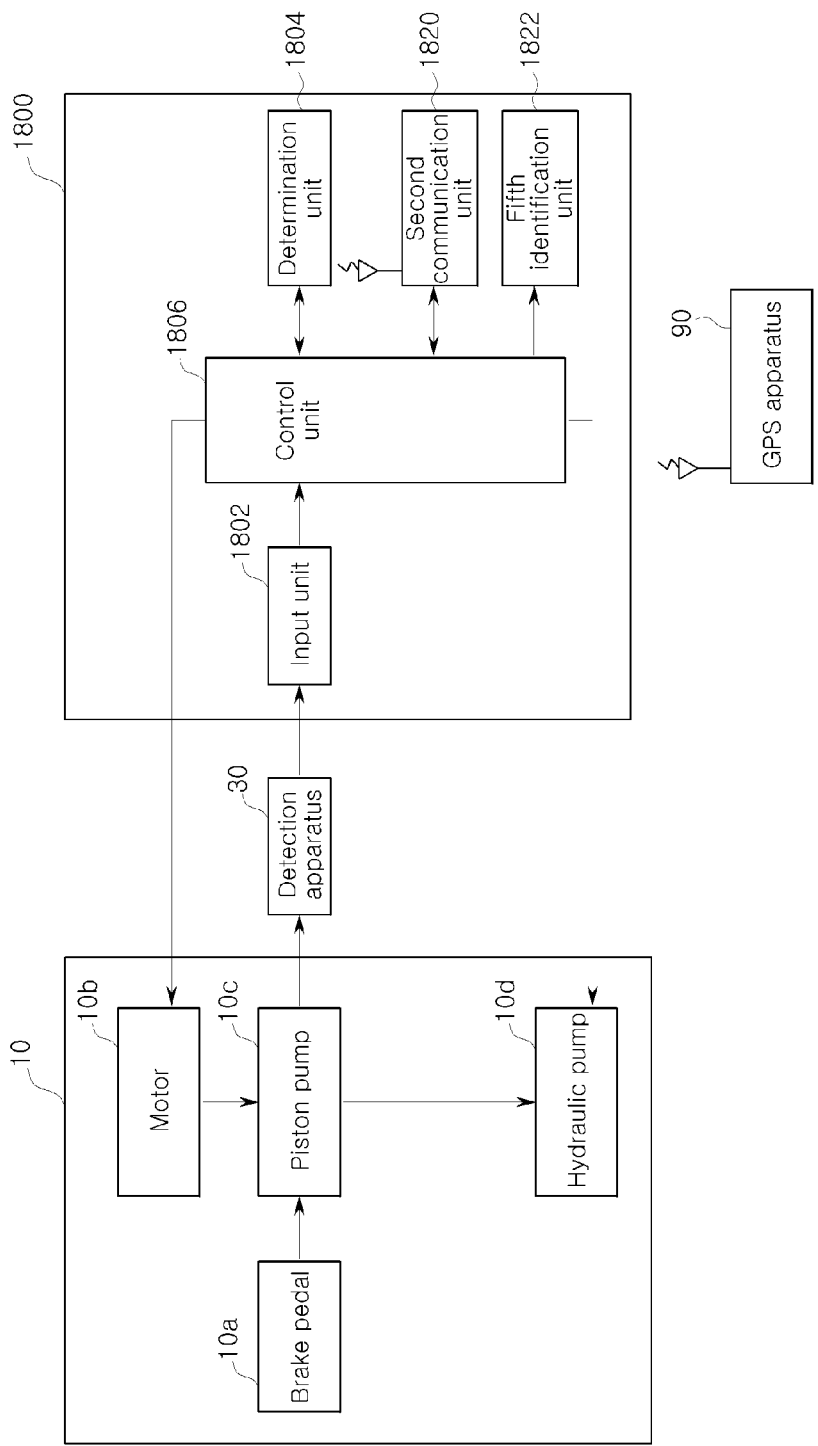
FIG. 19 is a block configuration diagram illustrating an example of the pressure control apparatus illustrated in FIG. 18.

FIG. 18 is a block configuration diagram illustrating a state in which a pressure control apparatus according to an eighth embodiment of the present invention is connected to a brake apparatus and a detection apparatus and communicates with a GPS apparatus, and FIG. 19 is a block configuration diagram illustrating an example of the pressure control apparatus illustrated in FIG. 18.

Referring to FIGS. 18 and 19, the pressure control apparatus 1800 according to the eighth embodiment of the present invention includes an input unit 1802, a determination unit 1804, and a control unit 1806 as in the pressure control apparatus 100 (FIG. 2) according to the first embodiment.

Because functions of the input unit 1802, the determination unit 1804, and the control unit 1806 of the pressure control apparatus 1800 according to the eighth embodiment of the present invention and an organic connection relation between the units are substantially the same as functions of the input unit 102 (FIG. 2), the determination unit 104 (FIG. 2), and the control unit 106 (FIG. 2) of the pressure control apparatus 100 (FIG. 2) according to the first embodiment and an organic connection relation between the units, detailed description thereof will be omitted hereinafter.

Here, the pressure control apparatus 1800 according to the eighth embodiment of the present invention may further include a second communication unit 1820 and a fifth identification unit 1822.

That is, the second communication unit 1820 may communicate with the GPS apparatus 90 according to control of the control unit 1806 and transfer a communication signal to the GPS apparatus 90 according to control of the control unit 1806 so that the GPS apparatus 90 finds location information of neighboring vehicle maintenance service centers when the determination unit 1804 determines that the number of iterations of the on/off operation of the brake apparatus 10 is out of a range of the predetermined number of times for the predetermined time.

At this time, although not illustrated, the second communication unit 1820 may include at least one of a Bluetooth module (not illustrated), a Wi-Fi module (not illustrated), a Zigbee module (not illustrated), a Wibro module (not illustrated), a Wi-Max module (not illustrated), an LTE module (not illustrated), an LTE Advanced module (not illustrated), an Li-Fi module (not illustrated), and a Beacon module (not illustrated), thereby communicating with the GPS apparatus 90.

Also, the fifth identification unit 1822 may cause the location information of the neighboring vehicle maintenance service centers found by the GPS apparatus 90 to be identified according to control of the control unit 1806.

At this time, although not illustrated, the fifth identification unit 1822 may include at least one of an HMI module (not illustrated) and an HUD module (not illustrated) mounted to allow the driver to identify the information or state of the vehicle through an interface between a user and a machine, and cause the found location information of the neighboring vehicle maintenance service centers to be identified through at least one of an HMI message display operation of the HMI module (not illustrated) and an HUD message display operation of the HUD module (not illustrated).

A pressure control method for controlling a pressure using the pressure control apparatus 1800 according to the eighth embodiment of the present invention will be described with reference to FIG. 20.

Figure 20:
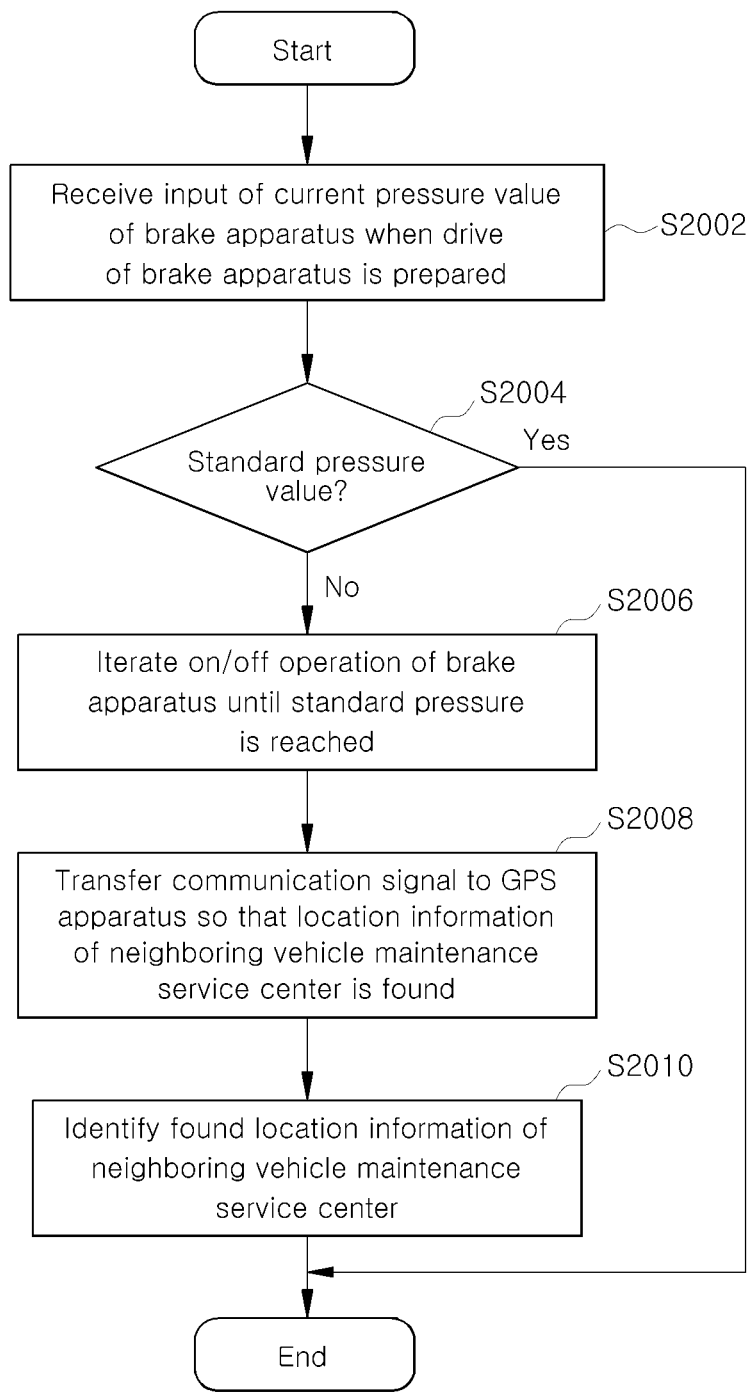
FIG. 20 is a flowchart illustrating an example of a pressure control method of the pressure control apparatus according to the eighth embodiment of the present invention.

FIG. 20 is a flowchart illustrating an example of the pressure control method of the pressure control apparatus according to the eighth embodiment of the present invention.

Referring to FIG. 20, the pressure control method 2000 of the pressure control apparatus 1800 (FIG. 19) according to the eighth embodiment of the present invention includes an input step S2002, a determination step S2004, and a first drive step S2006 as in the pressure control method 300 (FIG. 3) of the pressure control apparatus 100 (FIG. 2) according to the first embodiment.

Because functions of the input step S2002, the determination step S2004, and the first drive step S2006 in the pressure control method 2000 of the pressure control apparatus 1800 (FIG. 19) according to the eighth embodiment of the present invention and an organic connection relation between the steps are substantially the same as functions of the input step S302 (FIG. 3), the determination step S304 (FIG. 3), and the first drive step S306 (FIG. 3) in the pressure control method 300 (FIG. 3) of the pressure control apparatus 100 (FIG. 2) according to the first embodiment and an organic connection relation between the steps, detailed description thereof will be omitted hereinafter.

Here, the pressure control method 2000 of the pressure control apparatus 1800 (FIG. 19) according to the eighth embodiment of the present invention may further include a second communication step S2008 and a fifth identification step S2010.

As an example, the second communication step S2008 may be performed after the first drive step S2006 and the fifth identification step S2010 may be performed after the second communication step S2008.

That is, in the second communication step S2008, the second communication unit 1820 (FIG. 19) may communicate with the GPS apparatus 90 (FIG. 19) according to control of the control unit 1806 (FIG. 19) and transfer a communication signal to the GPS apparatus 90 (FIG. 19) according to control of the control unit 1806 (FIG. 19) so that the GPS apparatus 90 (FIG. 19) finds location information of neighboring vehicle maintenance service centers when the determination unit 1804 (FIG. 19) determines that the number of iterations of the on/off operation of the brake apparatus 10 (FIG. 19) is out of a range of the predetermined number of times for the predetermined time.

Thereafter, in the fifth identification step S2010, the fifth identification unit 1822 (FIG. 19) may cause the location information of the neighboring vehicle maintenance service centers found by the GPS apparatus 90 (FIG. 19) to be identified according to control of the control unit 1806 (FIG. 19).

As described above, the input unit 1802, the determination unit 1804, the control unit 1806, the second communication unit 1820, and the fifth identification unit 1822 included in the pressure control apparatus 1800 according to the eighth embodiment of the present invention perform the input step S2002, the determination step S2004, the first drive step S2006, the second communication step S2008, and the fifth identification step S2010 included in the pressure control method 2000 thereof.

Accordingly, the pressure control apparatus 1800 according to the eighth embodiment of the present invention and the pressure control method 2000 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 1800 according to the eighth embodiment of the present invention and the pressure control method 2000 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 1800 according to the eighth embodiment of the present invention and the pressure control method 2000 thereof may find location information of neighboring vehicle maintenance service centers and cause the found location information of the neighboring vehicle maintenance service centers to be identified when the number of iterations of the on/off operation of the brake apparatus 10 is out of a range of the predetermined number of times for the predetermined time.

Accordingly, the pressure control apparatus 1800 according to the eighth embodiment of the present invention and the pressure control method 2000 thereof enable the driver to easily find a vehicle maintenance service center.

Accordingly, the pressure control apparatus 1800 according to the eighth embodiment of the present invention and the pressure control method 2000 thereof may further prevent a traffic accident from occurring in advance while suppressing an increase in maintenance cost because a maintenance time for maintenance of the brake apparatus 10 may be shortened.

Figure 21:
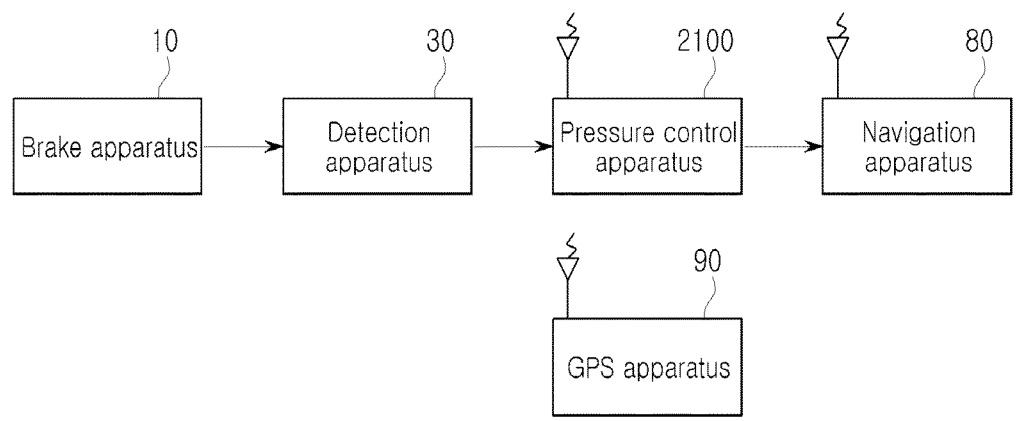
FIG. 21 is a block configuration diagram illustrating a state in which a pressure control apparatus according to a ninth embodiment of the present invention is connected to a brake apparatus and a detection apparatus and communicates with a navigation apparatus and a GPS apparatus.
Figure 22:
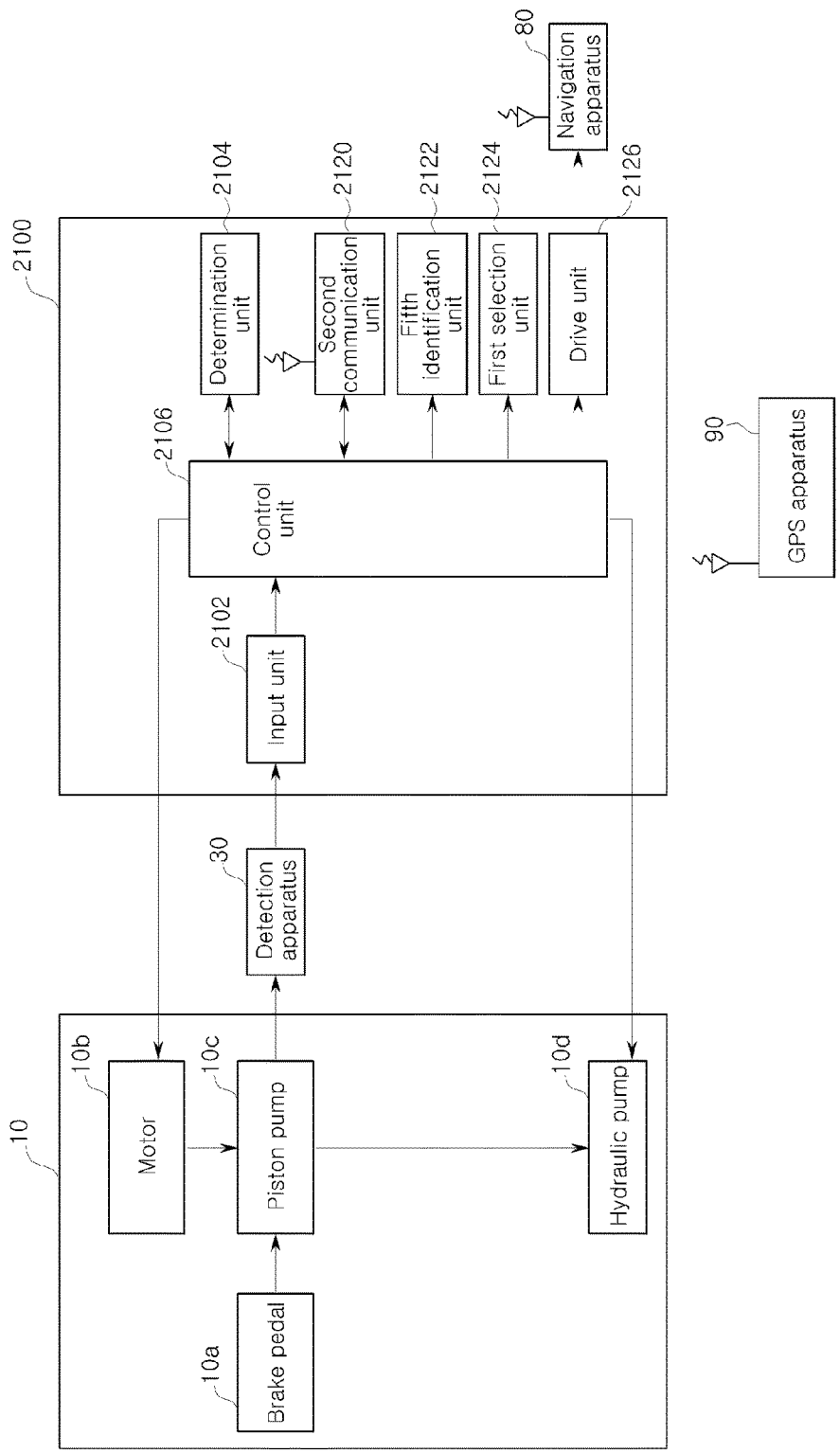
FIG. 22 is a block configuration diagram illustrating an example of the pressure control apparatus illustrated in FIG. 21.

FIG. 21 is a block configuration diagram illustrating a state in which a pressure control apparatus according to a ninth embodiment of the present invention is connected to a brake apparatus and a detection apparatus and communicates with a navigation apparatus and a GPS apparatus, and FIG. 22 is a block configuration diagram illustrating an example of the pressure control apparatus illustrated in FIG. 21.

Referring to FIGS. 21 and 22, the pressure control apparatus 2100 according to the ninth embodiment of the present invention includes an input unit 2102, a determination unit 2104, a control unit 2106, a second communication unit 2120, and a fifth identification unit 2122 as in the pressure control apparatus 1800 (FIG. 19) according to the eighth embodiment.

Because functions of the input unit 2102, the determination unit 2104, the control unit 2106, the second communication unit 2120, and the fifth identification unit 2122 of the pressure control apparatus 2100 according to the ninth embodiment of the present invention and an organic connection relation between the units are substantially the same as functions of the input unit 1802 (FIG. 19), the determination unit 1804 (FIG. 19), the control unit 1806 (FIG. 19), the second communication unit 1820, and the fifth identification unit 1822 (FIG. 19) of the pressure control apparatus 1800 (FIG. 19) according to the eighth embodiment and an organic connection relation between the units, detailed description thereof will be omitted hereinafter.

Here, the pressure control apparatus 2100 according to the ninth embodiment of the present invention may further include a first selection unit 2124 and a drive unit 2126.

That is, the first selection unit 2124 may select location information of a desired vehicle maintenance service center from location information of neighboring vehicle maintenance service centers identified by the fifth identification unit 2122.

As an example, the first selection unit 2124 may select location information of a desired vehicle maintenance service center from location information of neighboring vehicle maintenance service centers displayed in at least one of an HMI module (not illustrated) and an HUD module (not illustrated) through the driver's touch operation by finger.

Also, the drive unit 2126 may transfer a navigation drive signal to a navigation apparatus 80 according to control of the control unit 2106 for an arrival at a corresponding vehicle maintenance service center in correspondence with the location information of the vehicle maintenance service center selected from the first selection unit 2124.

At this time, although not illustrated, the input unit 2102, the determination unit 2104, the control unit 2106, and the drive unit 2126 may be provided in a conventional electric control unit (ECU) (not illustrated) which controls the overall operation, makes a determination, and transfers a navigation drive signal to the navigation apparatus 80 while receiving a current pressure value of the brake apparatus 10 as a main computer applied to a vehicle.

Also, although not illustrated, the input unit 2102, the determination unit 2104, the control unit 2106, and the drive unit 2126 may be provided in a conventional micro control unit (MCU) (not illustrated) which includes a processor, a memory, and an input/output apparatus inside a single chip, control the overall operation, makes the determination, and transfers the navigation drive signal to the navigation apparatus 80 while receiving the current pressure value of the brake apparatus 10.

Also, the input unit 2102, the determination unit 2104, the control unit 2106, and the drive unit 2126 are not limited to the ECU (not illustrated) or the MCU (not illustrated), but any control means, any determination means, any input means, and any drive means capable of controlling the overall operation of the vehicle, making the determination, and transferring the navigation drive signal to the navigation apparatus 80 while receiving a current pressure value of the brake apparatus 10 may be adopted.

Here, the input unit 2102, the determination unit 2104, the control unit 2106, and the drive unit 2126 may be integrally or separately provided in the ECU (not illustrated) or the MCU (not illustrated).

A pressure control method for controlling a pressure using the pressure control apparatus 2100 according to the ninth embodiment of the present invention will be described with reference to FIG. 23.

Figure 23:
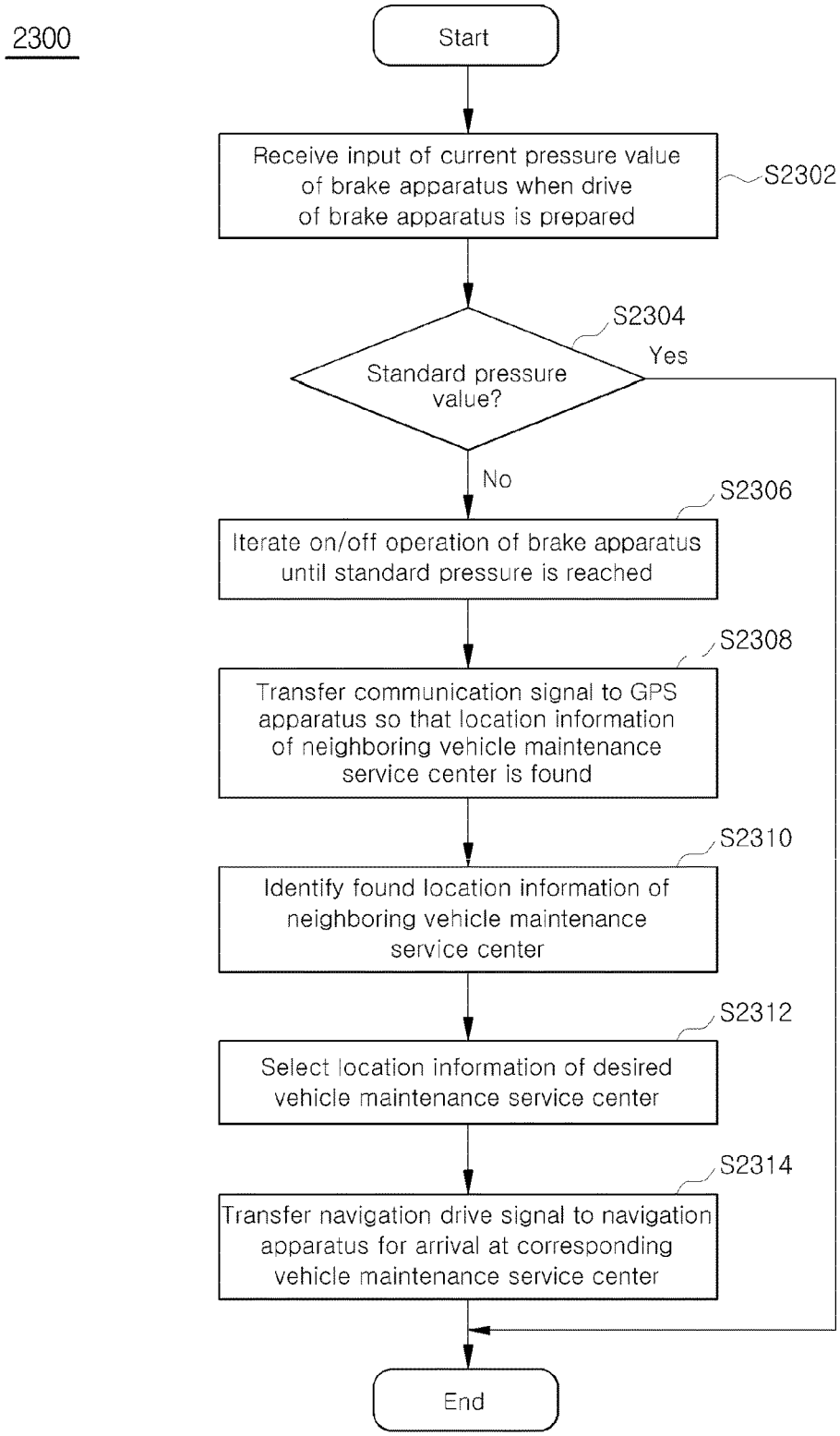
FIG. 23 is a flowchart illustrating an example of a pressure control method of the pressure control apparatus according to the ninth embodiment of the present invention.

FIG. 23 is a flowchart illustrating an example of the pressure control method of the pressure control apparatus according to the ninth embodiment of the present invention.

Referring to FIG. 23, the pressure control method 2300 of the pressure control apparatus 2100 (FIG. 22) according to the ninth embodiment of the present invention includes an input step S2302, a determination step S2304, a first drive step S2306, a second communication step S2308, and a fifth identification step S2310 as in the pressure control method 2000 (FIG. 20) of the pressure control apparatus 1800 (FIG. 19) according to the eighth embodiment.

Because functions of the input step S2302, the determination step S2304, the first drive step S2306, the second communication step S2308, and the fifth identification step S2310 in the pressure control method 2300 of the pressure control apparatus 2100 (FIG. 22) according to the ninth embodiment of the present invention and an organic connection relation between the steps are substantially the same as functions of the input step S2002 (FIG. 20), the determination step S2004 (FIG. 20), the first drive step S2006 (FIG. 20), the second communication step S2008 (FIG. 20), and the fifth identification step S2010 (FIG. 20) in the pressure control method 2000 (FIG. 20) of the pressure control apparatus 1800 (FIG. 19) according to the eighth embodiment and an organic connection relation between the steps, detailed description thereof will be omitted hereinafter.

Here the pressure control method 2300 of the pressure control apparatus 2100 (FIG. 22) according to the ninth embodiment of the present invention may further include a first selection step S2312 and a third drive step S2314.

As an example, the first selection step S2312 may be performed after the fifth identification step S2310 and the third drive step S2314 may be performed after the first selection step S2312.

That is, in the first selection step S2312, the first selection unit 2124 (FIG. 22) may select location information of a desired vehicle maintenance service center from location information of neighboring vehicle maintenance service centers identified by the fifth identification unit 2122 (FIG. 22).

Thereafter, in the third drive step S2314, the drive unit 2126 (FIG. 22) may transfer a navigation drive signal to the navigation apparatus 80 (FIG. 22) according to control of the control unit 2106 (FIG. 22) for an arrival at a corresponding vehicle maintenance service center in correspondence with the location information of the vehicle maintenance service center selected by the first selection unit 2124 (FIG. 22).

As described above, the input unit 2102, the determination unit 2104, the control unit 2106, the second communication unit 2120, the fifth identification unit 2122, the first selection unit 2124, and the drive unit 2126 included in the pressure control apparatus 2100 according to the ninth embodiment of the present invention perform the input step S2302, the determination step S2304, the first drive step S2306, the second communication step S2308, the fifth identification step S2310, the first selection step S2312, and the third drive step S2314 included in the pressure control method 2300 thereof.

Accordingly, the pressure control apparatus 2100 according to the ninth embodiment of the present invention and the pressure control method 2300 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for a predetermined time.

Accordingly, the pressure control apparatus 2100 according to the ninth embodiment of the present invention and the pressure control method 2300 thereof may perform a normal operation when the brake apparatus 10 is driven by removing a foreign object located in the brake apparatus 10 through initial diagnosis, thereby maintaining the current pressure and improving the efficiency of braking.

Also, the pressure control apparatus 2100 according to the ninth embodiment of the present invention and the pressure control method 2300 thereof may find location information of neighboring vehicle maintenance service centers when the number of iterations of the on/off operation of the brake apparatus 10 is out of a range of the predetermined number of times for the predetermined time, cause the found location information of the neighboring vehicle maintenance service centers to be identified, select location information of a desired vehicle maintenance service center from the identified location information of the neighboring vehicle maintenance service centers, and enable an arrival at a corresponding vehicle maintenance service center in correspondence with the selected location information of the vehicle maintenance service center.

Accordingly, the pressure control apparatus 2100 according to the ninth embodiment of the present invention and the pressure control method 2300 thereof may enable the driver to more easily find a vehicle maintenance service center and enable an arrival at a position of a desired vehicle maintenance service center.

Accordingly, the pressure control apparatus 2100 according to the ninth embodiment of the present invention and the pressure control method 2300 thereof may further prevent a traffic accident from occurring in advance while suppressing an increase in maintenance cost because a maintenance time for vehicle maintenance may be further shortened.

Figure 24:
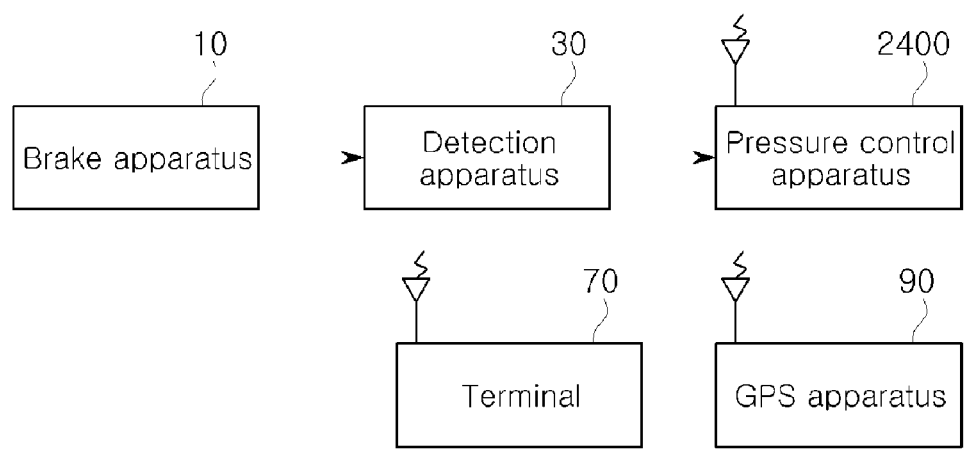
FIG. 24 is a block configuration diagram illustrating a state in which a pressure control apparatus according to a tenth embodiment of the present invention is connected to a brake apparatus and a detection apparatus and communicates with a terminal and a GPS apparatus.
Figure 25:
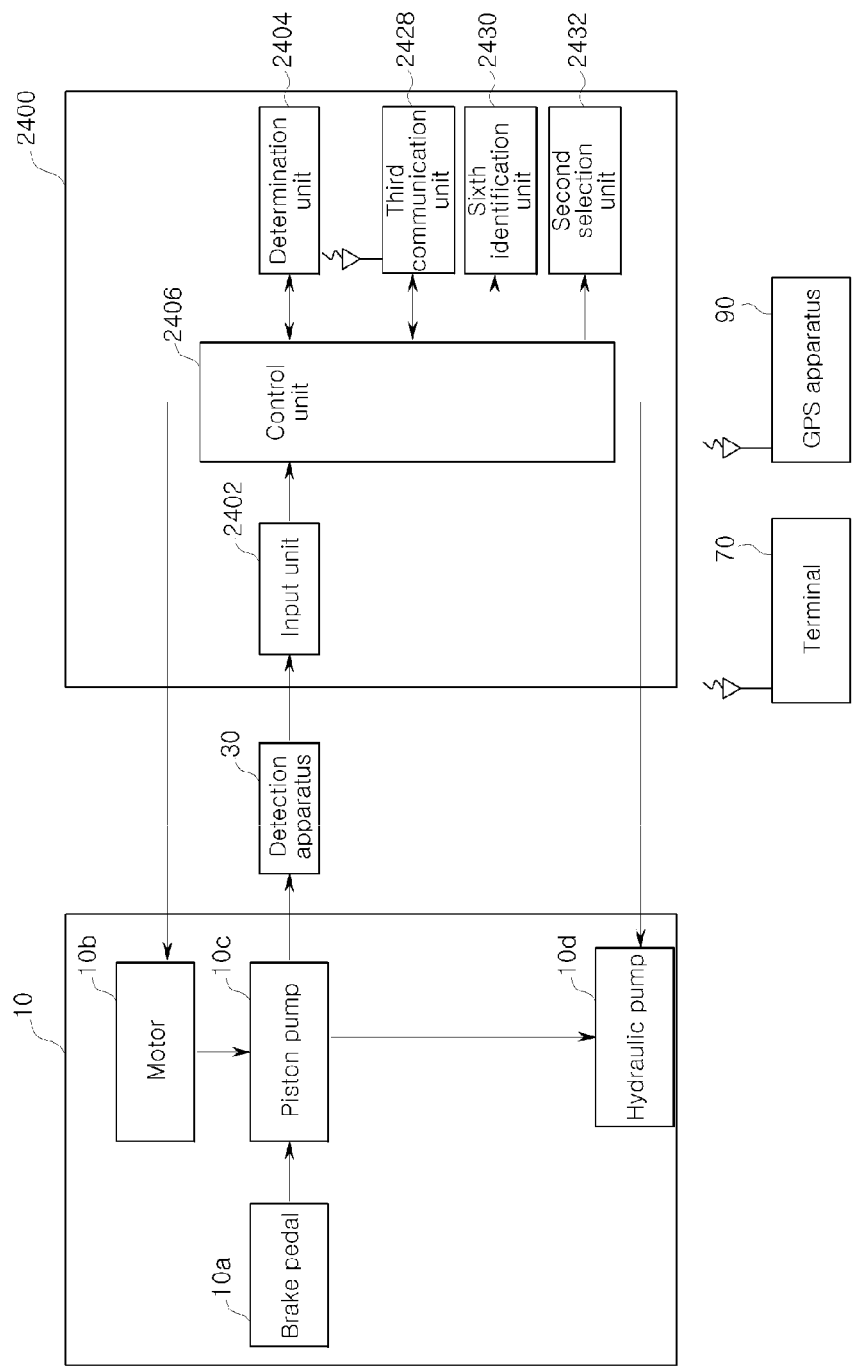
FIG. 25 is a block configuration diagram illustrating an example of the pressure control apparatus illustrated in FIG. 24.

FIG. 24 is a block configuration diagram illustrating a state in which a pressure control apparatus according to a tenth embodiment of the present invention is connected to a brake apparatus and a detection apparatus and communicates with a terminal and a GPS apparatus, and FIG. 25 is a block configuration diagram illustrating an example of the pressure control apparatus illustrated in FIG. 24.

Referring to FIGS. 24 and 25, the pressure control apparatus 2400 according to the tenth embodiment of the present invention includes an input unit 2402, a determination unit 2404, and a control unit 2406 as in the pressure control apparatus 100 (FIG. 2) according to the first embodiment.

Because functions of the input unit 2402, the determination unit 2404, and the control unit 2406 of the pressure control apparatus 2400 according to the tenth embodiment of the present invention and an organic connection relation between the units are substantially the same as functions of the input unit 102 (FIG. 2), the determination unit 104 (FIG. 2), and the control unit 106 (FIG. 2) of the pressure control apparatus 100 (FIG. 2) according to the first embodiment and an organic connection relation between the units, detailed description thereof will be omitted hereinafter.

Here, the pressure control apparatus 2400 according to the tenth embodiment of the present invention may further include a third communication unit 2428, a sixth identification unit 2430, and a second selection unit 2432.

That is, the third communication unit 2428 may communicate with the GPS apparatus 90 according to control of the control unit 2406 and communicate with the terminal 70 of the neighboring vehicle maintenance service center found by the GPS apparatus 90 according to control of the control unit 2406 when the determination unit 2404 determines that the number of iterations of the on/off operation of the brake apparatus 10 is out of a range of a predetermined number of times for a predetermined time.

At this time, although not illustrated, the third communication unit 2428 may include at least one of a Bluetooth module (not illustrated), a Wi-Fi module (not illustrated), a Zigbee module (not illustrated), a Wibro module (not illustrated), a Wi-Max module (not illustrated), an LTE module (not illustrated), an LTE Advanced module (not illustrated), an Li-Fi module (not illustrated), and a Beacon module (not illustrated), thereby communicating with the GPS apparatus 90 and the terminal 70.

Also, the sixth identification unit 2430 may cause information indicating whether to accept a movement request from the terminal 70 of the neighboring vehicle maintenance service center found by the GPS apparatus 90 to be identified according to control of the control unit 2406.

Also, although not illustrated, the sixth identification unit 2430 may include at least one of an HMI module (not illustrated) and an HUD module (not illustrated) mounted to allow the driver to identify the information or state of the vehicle through an interface between a user and a machine, and cause the information indicating whether to accept the movement request from the terminal 70 of the found neighboring vehicle maintenance service center to be identified through at least one of an HMI message display operation of the HMI module (not illustrated) and an HUD message display operation of the HUD module (not illustrated).

Also, the second selection unit 2432 may accept or reject the movement request in information indicating whether to accept the movement request identified by the sixth identification unit 2430.

As an example, the second selection unit 2432 may accept or reject the movement request in the information indicating whether to accept the movement request displayed by at least one of an HMI module (not illustrated) and an HUD (not illustrated) through the driver's touch operation by finger.

A pressure control method for controlling a pressure using the pressure control apparatus 2400 according to the tenth embodiment of the present invention will be described with reference to FIG. 26.

Figure 26:
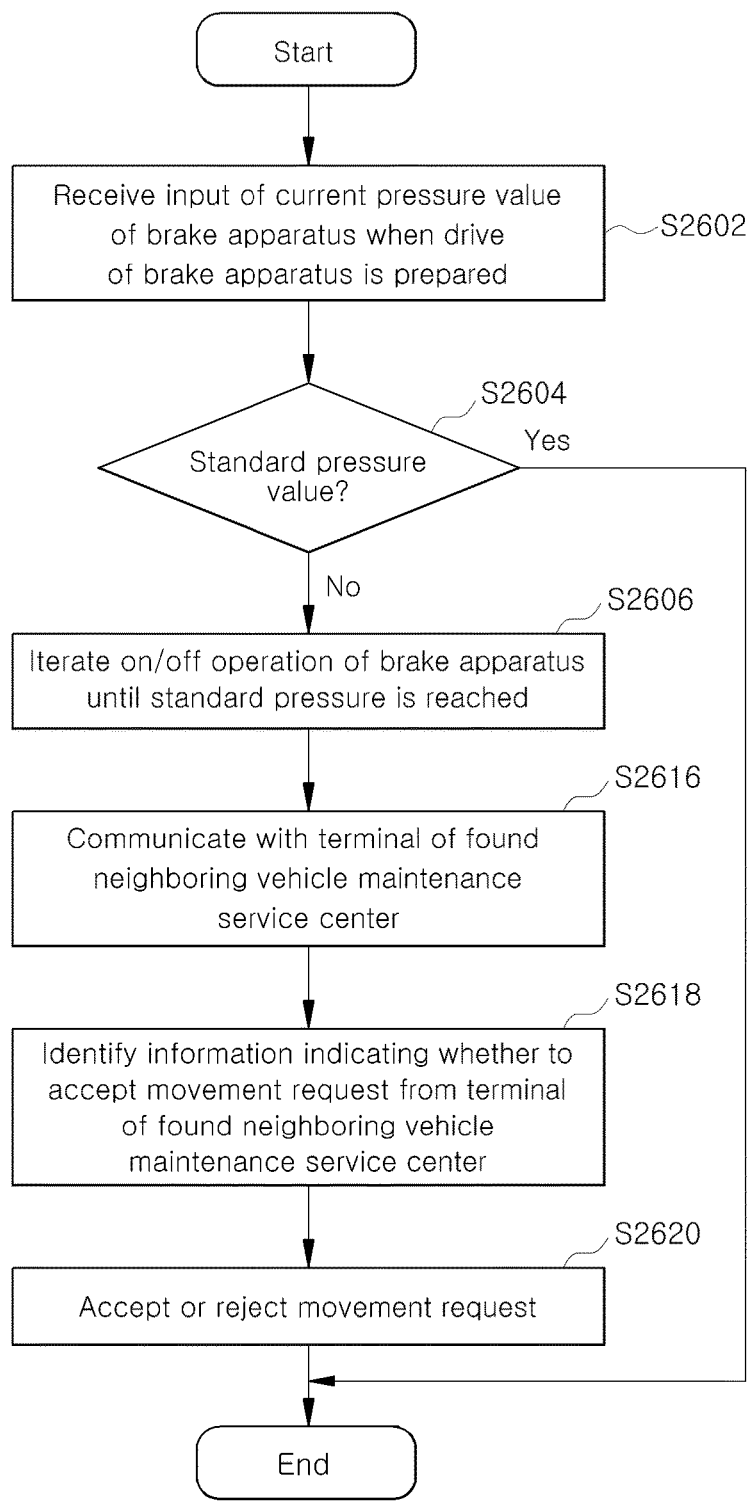
FIG. 26 is a flowchart illustrating an example of a pressure control method of the pressure control apparatus according to the tenth embodiment of the present invention.

FIG. 26 is a flowchart illustrating an example of the pressure control method of the pressure control apparatus according to the tenth embodiment of the present invention.

Referring to FIG. 26, the pressure control method 2600 of the pressure control apparatus 2400 (FIG. 25) according to the tenth embodiment of the present invention includes an input step S2602, a determination step S2604, and a first drive step S2606 as in the pressure control method 300 (FIG. 3) of the pressure control apparatus 100 (FIG. 2) according to the first embodiment.

Because functions of the input step S2602, the determination step S2604, and the first drive step S2606 in the pressure control method 2600 of the pressure control apparatus 2400 (FIG. 25) according to the tenth embodiment of the present invention and an organic connection relation between the steps are substantially the same as functions of the input step S302 (FIG. 3), the determination step S304 (FIG. 3), and the first drive step S306 (FIG. 3) in the pressure control method 300 (FIG. 3) of the pressure control apparatus 100 (FIG. 2) according to the first embodiment and an organic connection relation between the steps, detailed description thereof will be omitted hereinafter.

Here, the pressure control method 2600 of the pressure control apparatus 2400 (FIG. 25) according to the tenth embodiment of the present invention may further include a third communication step S2616, a sixth identification step S2618, and a second selection step S2620.

As an example, the third communication step S2616 may be performed after the first drive step S2606, the sixth identification step S2618 may be performed after the third communication step S2616, and the second selection step S2620 may be performed after the sixth identification step S2618.

That is, in the third communication step S2616, the third communication unit 2428 (FIG. 25) may communicate with the GPS apparatus 90 (FIG. 25) according to control of the control unit 2406 (FIG. 25) provided in a vehicle and communicate with the terminal 70 (FIG. 25) of the neighboring vehicle maintenance service center found by the GPS apparatus 90 (FIG. 25) according to control of the control unit 2406 (FIG. 25) when the determination unit 2404 (FIG. 25) determines that the number of iterations of the on/off operation of the brake apparatus 10 (FIG. 25) is out of a range of the predetermined number of times for the predetermined time.

Thereafter, in the sixth identification step S2618, the sixth identification unit 2430 (FIG. 25) may cause information indicating whether to accept the movement request from the terminal 70 (FIG. 25) of the vehicle maintenance service center found by the GPS apparatus 90 (FIG. 25) to be identified according to control of the control unit 2406 (FIG. 25).

Thereafter, in the second selection step S2620, the second selection unit 2432 (FIG. 25) may accept or reject the movement request in the information indicating whether to accept the movement request identified by the sixth identification unit 2430 (FIG. 25).

As described above, the input unit 2402, the determination unit 2404, the control unit 2406, the third communication unit 2428, the sixth identification unit 2430, and the second selection unit 2432 included in the pressure control apparatus 2400 according to the tenth embodiment of the present invention perform the input step S2602, the determination step S2604, the first drive step S2606, the third communication step S2616, the sixth identification step S2618, and the second selection step S2620 included in the pressure control method 2600 thereof.

Accordingly, the pressure control apparatus 2400 according to the tenth embodiment of the present invention and the pressure control method 2600 thereof may transfer a hydraulic adjustment command to the brake apparatus 10 so that the current pressure value reaches the standard pressure value if the current pressure value is not the standard pressure value when the drive of the brake apparatus 10 is prepared and cause an on/off operation of the brake apparatus 10 to be iterated a predetermined number of times for the predetermined time.

Accordingly, the pressure control apparatus 2400 according to the tenth embodiment of the present invention and the pressure control method 2600 thereof may perform a normal operation when the brake apparatus 10 is driven by removing a foreign object located in the brake apparatus 10 through initial diagnosis, thereby maintaining the current pressure and improving the efficiency of braking.

Accordingly, the pressure control apparatus 2400 according to the tenth embodiment of the present invention and the pressure control method 2600 thereof may communicate with the terminal 70 of the found neighboring vehicle maintenance service center when the number of iterations of the on/off operation of the brake apparatus 10 is out of a range of the predetermined number of times for the predetermined time, cause information indicating whether to accept a movement request from the terminal 70 of the found neighboring vehicle maintenance service center to be identified, and accept or reject the movement request in the identified information indicating whether to accept the movement request.

Accordingly, the pressure control apparatus 2400 according to the tenth embodiment of the present invention and the pressure control method 2600 thereof may enable a manager having the terminal 70 of the vehicle maintenance service center to make a movement request according to necessity.

Accordingly, the pressure control apparatus 2400 according to the tenth embodiment of the present invention and the pressure control method 2600 thereof may further prevent a traffic accident from occurring in advance while suppressing an increase in maintenance cost because a maintenance time for vehicle maintenance may be further shortened.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pressure control apparatus comprising:
   an input unit configured to receive an input of a current pressure value of a brake apparatus detected by a detection apparatus when drive of the brake apparatus is prepared, the brake apparatus comprising a motor and a hydraulic valve;
   a determination unit configured to determine whether the input current pressure value is a preset standard pressure value;
   a control unit configured to receive the current pressure value, transfer a determination command to the determination unit, and control the motor of the brake apparatus to maintain a constant torque of the motor while simultaneously iterating repeatedly on and off operations of the hydraulic valve of the brake apparatus so that the current pressure value reaches the standard pressure value when the current pressure value is not the standard pressure value; and
   a first identification unit configured to cause a normal pressure to be identified when the current pressure value is the standard pressure value or cause an abnormal pressure to be identified when the current pressure value is not the standard pressure value.

2. The pressure control apparatus according to claim 1,
   wherein the brake apparatus includes a brake pedal and a piston pump, and
   wherein the input unit receives the input of the current pressure value output from the piston pump through an operation of the motor according to a braking will of a driver who steps on the brake pedal.

3. The pressure control apparatus according to claim 1,
   wherein the determination unit determines whether the input current pressure value is the preset standard pressure value when the current pressure value is provided to the hydraulic valve.

4. The pressure control apparatus according to claim 1,
   wherein the control unit transfers a torque generation command corresponding to the hydraulic adjustment command to the motor, transfers a valve operation command to the hydraulic valve while generating a torque of the motor, and repeatedly iterates on and off operations of the hydraulic valve so that the current pressure value reaches the standard pressure value when the current pressure value is not the standard pressure value.

5. The pressure control apparatus according to claim 1, wherein the control unit further transfers a drive command to the brake apparatus so that the brake apparatus is driven when the current pressure value reaches the standard pressure value.

6. The pressure control apparatus according to claim 5, further comprising:
   a second identification unit configured to cause the fact that the current pressure value indicates a normal pressure to be identified when the drive command is transferred to the brake apparatus.

7. The pressure control apparatus according to claim 4, further comprising:

an electric charging unit configured to charge an electric charging apparatus with a drive signal corresponding to the torque of the motor when the torque of the motor is generated.

8. The pressure control apparatus according to claim 7, further comprising:
a third identification unit configured to cause a current amount of electric charge to be identified when the electric charging apparatus is charged with the drive signal.

9. The pressure control apparatus according to claim 7, further comprising:
a fourth identification unit configured to cause the fact that electric charging is completed to be identified when the electric charging apparatus is completely charged with the drive signal.

10. The pressure control apparatus according to claim 1, further comprising:
a first selection unit configured to select location information of a desired vehicle maintenance service center from location information of found neighboring vehicle maintenance service centers; and
a drive unit configured to transfer a navigation drive signal to a navigation apparatus for an arrival at the vehicle maintenance service center in correspondence with the selected location information of the vehicle maintenance service center.

11. A pressure control method comprising:
receiving an input of a current pressure value of a brake apparatus detected by a detection apparatus when drive of the brake apparatus is prepared, the brake apparatus comprising a motor and a hydraulic valve;
determining whether the input current pressure value is a preset standard pressure value;
receiving the current pressure value, transferring a determination command to a determination unit, and maintaining a constant torque of the motor while simultaneously iterating repeatedly on and off operations of the hydraulic valve of the brake apparatus so that the current pressure value reaches the standard pressure value when the current pressure value is not the standard pressure value; and
causing a normal pressure to be identified when the current pressure value is the standard pressure value or causing an abnormal pressure be identified when the current pressure value is not the standard pressure value.

12. A pressure control method comprising:
receiving an input of a current pressure value of a brake apparatus detected by a detection apparatus when drive of the brake apparatus is prepared, the brake apparatus comprising a motor and a hydraulic valve;
determining whether the input current pressure value is a preset standard pressure value;
receiving the current pressure value, transferring a determination command to a determination unit, and maintaining a constant torque of the motor while simultaneously iterating repeatedly on and off operations of the hydraulic valve of the brake apparatus so that the current pressure value reaches the standard pressure value when the current pressure value is not the standard pressure value; and
providing a driver with an identification of a normal pressure when the current pressure value is the standard pressure value or an identification of an abnormal pressure when the current pressure value is not the standard pressure value.

* * * * *